United States Patent
Hein et al.

(10) Patent No.: US 9,036,254 B2
(45) Date of Patent: May 19, 2015

(54) APPARATUS AND METHOD FOR TRANSMITTED LIGHT ILLUMINATION FOR LIGHT MICROSCOPES AND MICROSCOPE SYSTEM

(75) Inventors: Detlef Hein, Goettingen (DE); Juergen Fechti, Goettingen (DE); Gleb Milinovici, Goettingen (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 13/978,621

(22) PCT Filed: Aug. 16, 2012

(86) PCT No.: PCT/EP2012/003495
§ 371 (c)(1),
(2), (4) Date: Aug. 26, 2013

(87) PCT Pub. No.: WO2013/020715
PCT Pub. Date: Feb. 14, 2013

(65) Prior Publication Data
US 2014/0192408 A1      Jul. 10, 2014

(30) Foreign Application Priority Data

Sep. 23, 2011   (DE) .......................... 10 2011 114 252

(51) Int. Cl.
*G02B 21/06* (2006.01)
*G02B 21/08* (2006.01)
(52) U.S. Cl.
CPC .............. *G02B 21/06* (2013.01); *G02B 21/086* (2013.01)
(58) Field of Classification Search
CPC ..... G02B 21/06; G02B 21/086; G02B 21/365

USPC .......................................... 359/390, 391, 393
See application file for complete search history.

(56) References Cited

U.S. PATENT DOCUMENTS 4,255,014 A * 3/1981 Ellis .............................. 359/371
5,706,127 A   1/1998 Saito et al.
(Continued)

FOREIGN PATENT DOCUMENTS

DE       3213145 A1    10/1983
DE     10106275 A1     4/2002
(Continued)

OTHER PUBLICATIONS

Lehtiniemi, International Application No. PCT/EP2012/003495, International Search Report, Dated Nov. 16, 2012, 4 pages.
(Continued)

*Primary Examiner* — Scott J Sugarman
*Assistant Examiner* — William R Alexander
(74) *Attorney, Agent, or Firm* — Hoffman Warnick LLC

(57) ABSTRACT

An apparatus for transmitted light illumination for light microscopes A diaphragm edge may be variably positioned in the direction of the optical axis, wherein a position of the diaphragm edge in the direction of the optical axis can be varied irrespectively of a position of the diaphragm edge transversely to the optical axis. A separate sample support table may be mounted on a housing. The housing has a passage opening, through which the diaphragm edge can be moved in the direction of the optical axis. A holding device is formed in the region of the passage opening of the housing or on a separate sample support table and a control device is present which is adapted to position the diaphragm edge in dependence at least upon a determined presence of a sample support table.

17 Claims, 18 Drawing Sheets

(56) References Cited

U.S. PATENT DOCUMENTS

| | | | |
|---|---|---|---|
| 6,396,628 B1 * | 5/2002 | Osa et al. | 359/385 |
| 6,600,598 B1 * | 7/2003 | Piekos | 359/385 |
| 2001/0005280 A1 | 6/2001 | Ouchi | |
| 2002/0189174 A1 | 12/2002 | Thompson | |
| 2005/0259320 A1 | 11/2005 | Fujimura | |

FOREIGN PATENT DOCUMENTS

| | | |
|---|---|---|
| DE | 102004048099 A1 | 4/2006 |
| DE | 102004056685 A1 | 6/2006 |
| DE | 102007005790 A1 | 8/2008 |
| JP | 5825613 A | 2/1983 |
| JP | 2007219406 | 8/2007 |

OTHER PUBLICATIONS

International Application No. PCT/EP2012/003495, Preliminary Report on Patentability, Dated Mar. 25, 2014, 7 pages.

Application No. DE 10 2011 114 252.9, Search Report, Feb. 2, 2013, 5 pages.

* cited by examiner

APPARATUS AND METHOD FOR TRANSMITTED LIGHT ILLUMINATION FOR LIGHT MICROSCOPES AND MICROSCOPE SYSTEM

TECHNICAL FIELD

The present invention relates in a first aspect to a device for transmitted light illumination for light microscopes, in particular stereo microscopes or macroscopes, with a changing effective entrance pupil of an objective.

According to a further aspect the invention relates to a method for transmitted light illumination for a light microscope with changing entrance pupil of an objective. In addition the invention relates to a microscope system.

RELATED ART

A generic apparatus for transmitted light illumination for light microscopes is described for example in DE 10 2004 056 685 A1 and has a housing, in which a light source is provided to emit an illuminating light beam. The apparatus also comprises a holding device for holding a sample to be examined and at least one diaphragm edge for trimming the illuminating light beam, said diaphragm edge being arranged between the holding device and the light source and extending transversely to an optical axis, in particular of an objective, of a light microscope which can be positioned in an operating state on the apparatus for transmitted light illumination. A beam path of the illuminating light between the diaphragm edge and a sample held by the holding device is thereby free of adjustable beam-focussing components.

In the case of a generic method for transmitted light illumination for a light microscope with changing effective entrance pupil of an objective, a sample held by a holding device is exposed to illuminating light from a light source. An illuminating light beam emitted by the light source is trimmed by a diaphragm edge arranged between the holding device and the light source.

DE 10 2004 056 685 A1 describes a lighting device with two pivotable diaphragms. The pivot point of the diaphragms is thereby fixed and cannot be displaced. In addition there are no means for detecting, storing and/or reproducing the illumination settings of the pivotable diaphragms or pre-settings automatically adapted to the object. This lighting device therefore lacks ease of use. The usable region for additional components is greatly limited here and cannot be extended. The lighting device cannot thereby be used for some applications or can only be poorly used.

The prior art is explained in more detail using FIGS. 1 and 2.

FIG. 1 shows a typical stereo microscope arrangement according to the prior art. A transmitted light device DL illuminates the object field with a diameter OF, located in the plane OE, which is identified by the highest lying surface of the transmitted light device DL. On the transmitted light device DL there is a motorised focussing device MFT which can be operated by means of an operating unit BMFT and on which a carrier TR with a coded objective changer (COW) is arranged. By means of the objective changer COW, three objectives OBJ1, OBJ2, OBJ3 can be used with different properties. For example the objective OBJ2 has, besides a further objective magnification with the smallest zoom factor β, also an entrance pupil which clearly lies at a greater distance from the object plane OE than the other two objectives. In FIG. 1, BMAB identifies an operating element for a motorised aperture diaphragm MAP. A plane at the level of the object support on the transmitted light device is identified by an E. MFT identifies a motorised focussing device.

On the carrier TR, there is a motorised zoom body MZK which can be used via an operating unit BMZK. On the motorised zoom body MZK there is an objective barrel T, with which the stereo microscope image can be observed directly by the two oculars OK. In addition the objective barrel T also facilitates documentation of the images seen by means of a connected camera K.

The transmitted light means DL according to the prior art which is not motorised is supplied with light by a cold light source KLD via a fibre optic light conductor LL. It has three manually settable operating elements SR1, SR2, SR3 for varying the light settings.

The whole system is controlled by the electronic module EM and the operating unit BE connected thereto. Communication within the whole system is achieved for example by means of a CAN bus.

For further observation, a coordinate system with the coordinate axes X, Y and Z is introduced. The coordinate origin lies in the centre of the object plane OE. For reasons of simplification, in this illustration the focus is on the upper side of the transparent object support TOA, that is to say OE is identical to the upper side of the transparent object support TOA and lies in the plane which spans across the coordinate axes X and Y. The positive half axes point, as seen by the user, in the following directions: X to the right, Y to the rear, Z upwards. The Z axis is identical to the optical axis OA of the momentarily connected objective.

For stereomicroscopes and macroscopes, there are numerous transmitted light illumination methods which cannot provide a suitable illumination for all possible imaging conditions, this being mainly due to the zoom function of the zoom body MZK. This applies in particular to the region of overview, that is to say for the smaller zoom factors of the zoom body. The lighting of stereo microscopes and macroscopes is frequently homogenised with suitable means, for example with milk glasses. This does indeed allow the homogeneity of the lighting to be improved but the contrast and brightness decrease correspondingly due to the light distribution across large spatial angle regions and the detrimental scattering light increases. The correspondingly illuminated overview images thus provide only very poor contrast. Many details can only be recognised with larger zoom factors $\beta$. The required zooming-in and zooming-out thereby require a long time and the overview is lost during the zoom process with larger zoom factors $\beta$.

FIG. 2 shows the operating principle of a known transmitted light device DL from FIG. 1. The front area FF of the light conductor LL is approximately imaged at infinity by means of an asphere ASPH. This means that the light beams output from a common point of the front area FF of the light conductor extend behind the asphere in parallel. By way of example, FIG. 2 shows the light beams ST1 ST2, ST3, ST4 and ST5 starting from a common point on the light conductor LL. Behind the asphere ASPH there is a deflection mirror SP which can be moved or rotated in different directions via the three operating elements SR1, SR2, SR3 shown in FIG. 1.

By means of the operating unit SR1, the mirror SP is rotated about the rotation axis DA as far as the desired adjustment angle α, whereby the light beams contacting the deflection mirror SP can be deflected in the respective directions. The operating unit SR2 allows the deflection mirror SP to be moved together with the rotation axis DA in the displacement direction VR. The light beams reflected by the deflection mirror SP thereby enter, in dependence upon the mirror position, at various points through the transparent object support TOA and the object plane OE.

By means of the operating element SR3, the deflection mirror SP is moved in the X direction, thus perpendicular to the illustration plane. Without changing the mirror geometry, another mirror surface is thereby effectively created with deviating reflection properties. None of the two usable mirror surfaces has 100% reflection orientation, that is to say they reflect with scattering diffusion, wherein the scattering proportion of the two mirror surfaces differs. In order to achieve illumination which is as homogeneous as possible, the greater scattering mirror surface is to be used, whereby the contrast is impaired and the image brightness decreases.

At the expense of homogeneity, the contrast can increase if the weaker scattering mirror surface is used. This corresponds more to a directed illumination.

The adjustment of the described illumination parameters requires certain experience to be held by the operator, i.e. untrained users might not have the skills to use the lighting adjustment via the three operating elements SR1, SR2, SR3 without further assistance.

Transmitted light devices DL, which contain an inclinable deflection mirror SP according to FIG. 2 also require a relatively large construction height in order to illuminate larger object fields, this being due to construction reasons. In spite of this, the achievable homogeneity and contrasting is not yet optimal even with a large structural height with this arrangement.

In case of normal light microscopes and some macroscopes, transmitted light illumination methods are known which require a fixed pupil plane. In most cases, then, contrast-increasing elements are brought into the light beam path and/or the imaging beam path, in particular into the objective pupil or a plane conjugated therewith. This requires extremely great resources and can only be achieved, if at all, with great limitations on zoom systems, and thus on stereo microscopes and macroscopes. These conventional methods only function with special objectives with expensive accessories, for example DIC sliders and only in certain zoom regions. The optical design requires unfavourably large installation spaces as well as strain-free optics for polarisation methods. In addition a possibility must be provided in the illumination device for manipulating the contrast-increasing elements and in general also a possibility for adaptation to different sized object fields through exchangeable condenser lenses. These solutions are therefore only suitable for special applications and in addition are very expensive.

All solutions according to the prior art require great resources in their realisation and/or leave much to be desired in terms of user-friendliness and usable installation space.

SUMMARY OF THE INVENTION

It can be seen as an object of the invention to create an apparatus and a method for transmitted light illumination for light microscopes and a microscope system based thereon, which is to be realised in principle with simple technical means. In addition, ease of use is to be improved in comparison with the prior art.

Advantageous embodiments of the device according to the invention and preferred variants of the method according to the invention are explained below with reference to the dependent claims and in particular in connection with the attached drawings.

An apparatus of the above-mentioned type is further developed according to the invention in that for the adaptation of the beam path of the illuminating light to the effective entrance pupil of the objective, means are provided for variable positioning of the diaphragm edge in the direction of the optical axis, whereby a position of the diaphragm edge can be varied in the direction of the optical axis independently of a position of the diaphragm edge transversely to the optical axis, assembly means being provided on the housing for mounting a separate sample support table, means for determining the presence of a sample support table being provided, the housing having a passage opening, through which the diaphragm edge can be moved in the direction of the optical axis, the holding means being formed in the region of the passage opening of the housing or on a separate sample support table and a control device being present which is adapted to position the diaphragm edge in dependence at least upon the determined presence of a sample support table.

In the method according to the above type, in particular a beam path of the illuminating light is passed between the diaphragm edge and the sample held by the holding device free of adjustable beam-focussing components, whereby the light source is arranged in a housing, on which a separate sample support table can be mounted with assembly means, wherein the holding device is formed in the region of the passage opening of the housing or on a separate sample support table and wherein the housing has a passage opening, through which the diaphragm edge can be moved in the direction of an optical axis. The method is further developed according to the invention in that the presence of a sample support table is determined, the diaphragm edge extends transversely to an optical axis, in particular of the objective, and is positioned in dependence upon the position of the effective entrance pupil of the objective and in dependence upon at least a determined presence of a sample support table in the direction of the optical axis.

Protection is also claimed for a microscope system which has a light microscope and an apparatus according to the invention for transmitted light illumination.

The first core idea of the invention can be seen in that the illuminating light emitted by the light source can be trimmed with a diaphragm edge, wherein the diaphragm edge can be adjusted in the direction of the optical axis according to the position of the effective entrance pupil of the optical system.

By way of a further essential idea of the invention it can be seen that it is automatically recognised whether a sample support table has been placed on the housing of the transmitted light illumination. Without a sample support table, a sample to be examined can be held on a holding device formed on the passage opening of the housing. This holding device on the housing can be configured for example through a depression for an object carrier or a transparent object support. In the case of a sample support table, the holding device of the sample support table is used to hold the sample. The sample is thereby held at a position which is offset in relation to the case without a sample support table in the direction of the optical axis. The direction indication "in the direction of the optical axis" is used within the scope of the present description synonymously with "along the optical axis".

The transmitted light illumination can advantageously be adapted with the method according to the invention and the apparatus according to the invention, in the case of a light microscope having changing entrance pupil, automatically to different object positions arising through the use of different accessories.

In order to arrange the sample support table, assembly means are provided according to the invention on the housing of the apparatus for transmitted light illumination. These assembly means can be configured in principle as desired provided that the sample support table is held with the assembly means in a defined position. For example the housing and a lower side of the sample support table can be formed suitably for a mechanical engagement with each other. For a particularly stable hold, screws, clamps, snap-on or magnetic connections are also possible.

A cost-effective extension of the field of use of the apparatus for transmitted light illumination can be provided with the sample support table. There is space inside the sample support table for accessories, for example for further light sources such as a ring light for dark field microscopy.

According to a preferred embodiment of the apparatus according to the invention, means are provided for identifying a sample support table and the control device is configured to position the diaphragm edge in dependence upon an ascertained identity of a sample support table. According to one configuration of the apparatus according to the invention, sample support tables of differing construction heights are present, of which one can be selected for mounting on the housing. Insofar as the control device is configured to determine the identity of a separate sample support table, it is also possible to distinguish between sample support tables of different heights.

Since, due to a separate sample support table, the object plane on which a sample to be examined is located is changed, an illumination of the objective used should correspondingly be adapted as much as possible. The control device is thus adapted according to the invention to position the diaphragm in dependence upon a determined presence of a separate sample support table.

For ideal illumination of the objective used, a positioning of the diaphragm within the sample support table can be useful. In case of a preferred embodiment of the apparatus according to the invention the control device is thus adapted to move the diaphragm edge out of the housing through the passage opening into the inner space of the sample support table. Collision between the diaphragm edge and the holding device of the sample support table can thus be avoided because through the detection of the identity of the sample support table the position of the holding device is also known.

According to a preferred embodiment of the device according to the invention the control device is adapted to move the diaphragm edge through the passage opening of the housing if the means for determining the presence of a sample support table actually determine the presence of a sample support table. If accessories are introduced into the sample support table which cover a movement space of the diaphragm edge, it can be provided that the control device also considers further accessories in the positioning of the diaphragm edge in order to avoid collisions.

The method according to the invention can be realised in particular with the apparatus according to the invention for transmitted light illumination. In this connection, in the case of the microscope system according to the invention a control device is provided in an advantageous variant, which is connected to components of the light microscope and the transmitted light illumination apparatus, whereby it is configured to control the microscope and the apparatus for transmitted light illumination in order to carry out the method according to the invention.

According to a particularly simple variant there are no beam-focussing components between the diaphragm edge and the sample, in particular no beam-forming components.

The term "optical axis" is intended in the present description to mean essentially and as a rule the optical axis of an objective of a light microscope which is arranged or positioned in an operating state on the apparatus according to the invention for transmitted light illumination.

If the connected light microscope is a stereo microscope with mid-light beams LM and RM inclined relative to each other, the term "optical axis" can mean:
  i) the optical axis of the objective in the case in which the objective only symmetrically detects an observation channel;
  ii) the angle bisector between the two mid-light beams if the two observation channels are detected through the objective, or, however,
  iii) the mid-light beam of only one channel if only one observation channel is not symmetrically detected.

The term "optical axis" can thus also be defined having regard to the apparatus according to the invention for transmitted light illumination itself in the sense that essentially the direction is meant, in which the illuminating light is radiated. In the usual case the apparatus for transmitted light illumination according to the invention is formed as a substantially flat box which lies for example on a laboratory table. In this case the optical axis points in the direction of the vertical direction, thus in the Z direction.

The term "holding device" is to be functionally interpreted for the purposes of the present invention, i.e. each means is meant, with which a sample to be examined can in some way be positioned relative to the illuminating light beam and the optics of a light microscope to be connected.

The term "effective entrance pupil" is to be interpreted in terms of phenomenon. Accordingly it is not a calculated or theoretical entrance pupil of the optical system, but instead in fact the region, in which a waist of the illuminating light beam has a minimum cross section, wherein with the illuminating light beam only beam portions are meant that β-tually contribute to the illumination. This surface region, in the present case referred to as the effective entrance pupil, is determined by measuring, thus testing. In practice the position of this effective entrance pupil, besides the optics used, also depends upon the sample examined and sample holders such as object carriers or other transparent sample supports and in case of usual zoom microscopes is not a well-defined flat surface.

According to a particularly preferred variant of the method according to the invention the diaphragm edge is positioned in a plane of an effective entrance pupil of the objective. In particular the diaphragm edge can be arranged in a direction transversely to the optical axis in such a way that it just contacts the entrance pupil in a direction transversely to the optical axis. An advantageous technical effect is thereby achieved in that a considerable part of the illuminating light, which could have contributed to the scattered light without the diaphragm is now filtered out.

The positioning of the diaphragm edge in the plane of the effective entrance pupil thus opens up the possibility of achieving an inclined light illumination in that the diaphragm edge covers a part of the effective entrance pupil. It is particularly preferable for the diaphragm edge to trim the illuminating light beam asymmetrically in these embodiments. This means that certain beams of the illuminating light are selected and result in an inclined light illumination. In practice, advantageous improvements in contrasting can thus be achieved. For this end, in a particularly advantageous embodiment of the apparatus according to the invention the diaphragm edge is a linear diaphragm edge. In principle, curved diaphragm edges can also be used.

According to a further advantageous embodiment of the method according to the invention, the diaphragm edge can accordingly be positioned in a direction perpendicular to the optical axis in order to set brightness and contrast. According to the apparatus according to the invention for transmitted light illumination, it is particularly preferable for suitable means for variable positioning of the diaphragm edge in a direction perpendicular to the optical axis to be present.

Illuminating light which enters the optical system from locations outside of the entrance pupil, thus the microscope objective, cannot contribute there in the transmitted light brightness field image to the image itself but instead only to the scattered background. This is undesirable and gives rise to a further advantageous method variant, in which a light source is adapted to the light source of an actually effective back-projection of the illuminating light. This means that parts of the illumination area which cannot provide illuminating light contributing to the image are filtered out at the start. To this end, according to the apparatus according to the invention, at least one further diaphragm is advantageously present, which is positioned directly upstream of the light source, in order to vary an effective illumination area.

An IDFII film (image directing film) with an asymmetrical prism structure can preferably be utilised which is used in combination with a homogeneously irradiating light area. This can preferably be achieved via a surface light with a directed radiation characteristic, for example a PHLOX area light. The IDFII film can preferably be inclined and/or mounted rotationally azimuthally.

According to a further advantageous embodiment of the apparatus according to the invention, at least one further variably positionable diaphragm is present to trim the illuminating light beam between the holding device and the light source. With such a further diaphragm, which can comprise in particular a linear diaphragm edge, further improvements can be achieved having regard to the reduction of scattered light. In addition it can be useful for certain positions of the effective entrance pupil to have a further variably positionable diaphragm.

According to a particularly preferred embodiment of the apparatus according to the invention, accessories can be inserted in the sample support table, in particular a ring light for dark field microscopy. In addition means for determining the presence of accessories inserted into the sample support table are present and the control device is adapted to position the diaphragm edge in dependence upon a determined presence of accessories introduced into the sample support table. The diaphragm edge can thus advantageously also be positioned outside of the housing if there are no accessories there. A collision between the diaphragm edge and the accessories can hereby be avoided.

According to a further preferred variant of the apparatus according to the invention it is provided that assembly means for at least one adapter plate are present to influence the illuminating light beam, in particular for a polarisation filter, a colour filter, a diffuser and/or a diaphragm, as well as means for determining the presence of an adapter plate and the control device is adapted to position the diaphragm edge in dependence upon a determined presence of an adapter plate. The assembly means for the adapter plate can be formed for example as a recess or push-in opening on the passage opening of the housing. A utilised adapter plate is hereby arranged below the holding device of the housing. In this case, even when the sample support table is in place, the table inner space is not available to the diaphragm. The control device thus delimits a permitted movement space of the diaphragm edge to a region within the housing that ends directly in front of the adapter plate. The control device can also be adapted to consider a direction influence of the illuminating light beam caused by the adapter plate and to move the diaphragm edge to another position compared to a case without an adapter plate. Suitable positions of the diaphragm edge can be previously determined by measurements and stored in a memory of the control device.

Means are preferably also present to determine the identity of accessories inserted in the sample support table and the control device is adapted to position the diaphragm edge in dependence upon a determined identity of accessories inserted in the sample support table.

In addition it is preferable for means to be available to determine an identity of an adapter plate and for the control device to be adapted to position the diaphragm edge in dependence upon a determined identity of an adapter plate. It is thus advantageously possible to distinguish between different accessories and/or different adapter plates and for a permitted movement space for the diaphragm edge to be determined in dependence upon the dimensions of the identified adapter plate and/or the identified accessories.

According to a particularly preferred embodiment of the apparatus according to the invention the means for determining the presence and in particular identity of a sample support table, the means for determining the presence and in particular identity of accessories inserted in the sample support table and the means for determining the presence and in particular identity of an adapter plate respectively comprise a magnetic field sensor, in particular a Hall sensor. In principle, however, other sensors, for example pressure sensors, optical sensors or capacitive proximity switches, can also be used. The means for determining the presence of a sample support table and the means for determining the identity of a sample support table can thus be formed by the same device, namely a magnetic field sensor. The same applies having regard to the determination of the presence and identity of accessories and the adapter plate.

According to a variant according to the invention a distinction can be made between different sample support tables in that they are equipped with magnets of differing strength. The control device is then adapted to distinguish the sample support tables using the magnetic field strength determined by the Hall sensor. Instead of magnets with differing strength, the magnets can also be arranged on the sample support tables in such a way that, in a set-up state of the sample support table, they come in differing vicinity of the Hall sensor. Similarly it is possible to distinguish between different accessories and between different adapter plates.

According to a further preferred embodiment of the apparatus according to the invention, using the means for variable positioning of the diaphragm edge in the direction of the optical axis and the means for variable positioning of the diaphragm edge in a direction transverse to the optical axis, the diaphragm edge can be rotated about a rotation axis which is transverse to the optical axis. In comparison with displacement in the direction of the optical axis, through a rotation the space requirement of the diaphragm is advantageously smaller in a plane transverse to the optical axis. It is thereby also possible to move the diaphragm edge through a comparatively small passage opening. The size of the passage opening is generally orientated to the size of usual transparent object supports, for example glass plates with an outer diameter of 120 mm, and cannot be selected to be as large as desired.

Accordingly in a preferred variant of the method according to the invention it is provided that in order to move the diaphragm edge through the passage opening, the diaphragm edge is rotated about a rotation axis transverse to the optical axis. The diaphragm edge is thus completely moved through the passage opening while the diaphragm as a whole is only guided in part through the passage opening.

According to a further preferred embodiment of the method according to the invention, in order to determine a position of the diaphragm edge, particularly after switching on the apparatus for transmitted light illumination, said diaphragm edge is moved into a reference position. The starting position is unknown here. In order to avoid a collision between the diaphragm edge and the holding device, the diaphragm edge is thereby moved about a rotation axis, which is transverse to the optical axis, in a direction away from the sample to be examined. Subsequently the diaphragm edge can be moved out of the illuminating light beam into the reference position. Through rotation, the diaphragm edge is moved approximately parallel to the optical axis in the direction towards the light source. If the diaphragm edge is located in the unknown starting position outside of the housing, the diaphragm edge is thus moved initially along the optical axis through the passage opening into the housing without colliding with the housing or the holding device.

According to a further preferred variant of the method according to the invention, if the diaphragm edge has been moved through the passage opening into the sample support table and it is ascertained with the means for determining the presence of a sample support table that the sample support table has been removed, the diaphragm edge moves back into the housing. In a situation in which the diaphragm edge has been moved out of the housing, however, but no sample support table is put in place, there is a risk of the user injuring himself on the diaphragm edge. This risk is avoided by the diaphragm edge moving automatically back into the housing.

Alternatively, according to a likewise preferred variant of the method according to the invention it is provided that, if the diaphragm edge has been moved through the passage opening into the sample support table and it is determined with the means for determining the presence of a sample support table that the sample support table has been removed, movement of the diaphragm edge is blocked. The risk of injuries through the diaphragm edge is hereby reduced.

It is particularly preferable for means to be present for enquiring concerning a microscope setting and/or a microscope configuration. Settings of the at least one diaphragm edge, further diaphragms and/or further optical components are then carried out in an automated manner in dependence upon a determined configuration of existing, in particular, optical components. For example it can be automatically recognised which objective is actively set and which zoom position is set.

According to a microscope system according to the invention a storage device is provided for this purpose, in which settings of the transmitted light device and the light microscope, in particular the at least one diaphragm edge, are stored.

According to a preferred exemplary embodiment of the method according to the invention it is provided that a microscope setting and/or a microscope configuration is/are enquired and that using the microscope setting and/or the microscope configuration an optimal diaphragm position is determined. It is also provided that a presence of a sample support table, a presence of accessories introduced into the sample support table and/or a presence of an adapter plate are determined and, from this information, an available movement space of the diaphragm edge in the direction of the optical axis is determined and the diaphragm edge is positioned in the available movement space as close as possible to the optimal diaphragm position. The wording "as close as possible" is to be understood to mean that the diaphragm edge is positioned at the optimal diaphragm position if the optimal diaphragm position lies inside the available movement space and that, if the optimal diaphragm position lies outside of the available movement space, the diaphragm edge is positioned at an end of the available movement space adjacent to the optimal diaphragm position.

A microscope configuration usefully comprises at least one type of a zoom system and/or a selected objective.

A microscope setting contains at least one zoom magnification and/or a position of a selected objective.

In case of knowledge of the objective used, a zoom body used and an magnification set with the zoom position, the diaphragm edge can be moved to an optimal position which can be predetermined and stored for the objective-zoom body combination. The optimal position can correspond in particular in the direction of the optical axis to the position of the effective entrance pupil. At this position, the illuminating beam path of the light microscope has a waste.

The optimal diaphragm position can be stored for the respective microscope setting and/or microscope configuration and be determined for example through trials. By way of judging criterion of an optimal diaphragm position, different illumination parameters can be used, in particular a lighting homogeneity, an image contrast and/or shadow in the microscope image.

According to a modified variant of this exemplary embodiment according to the invention, a prism film can additionally be brought into the beam path. This comprises a plurality of prisms, with which the illuminating light beam is deflected in the known way. The prism film can then be moved precisely into the beam path of the illuminating light beam if the optimal position lies outside of the available movement space.

In this variant of the method according to the invention it is thus provided that a microscope setting and/or microscope configuration can be enquired, that using the microscope setting and/or the microscope configuration an optimal diaphragm position is determined, that the presence of a sample support table, the presence of accessories introduced into the sample support table and/or the presence of an adapter plate are detected and thus an available movement space of the diaphragm edge in the direction of the optical axis is determined. It is also provided that it is checked if the optimal diaphragm position lies within the available movement space, that, if the optimal diaphragm position lies outside of the available movement space, a prism film is moved into the illuminating light beam, and that, if the optimal diaphragm position lies in the available movement space, the diaphragm edge is positioned at the optimal diaphragm position.

BRIEF DESCRIPTION OF THE DRAWINGS

Further advantages and features of the apparatus according to the invention, the method according to the invention and the microscope system according to the invention are explained below by reference to the drawing, in which.

Similar components and those which work similarly are provided with the same reference numerals in the drawings. Reference is also made to the list of reference numerals at the end of the description.

DETAILED DESCRIPTION OF THE INVENTION

Figure 1:
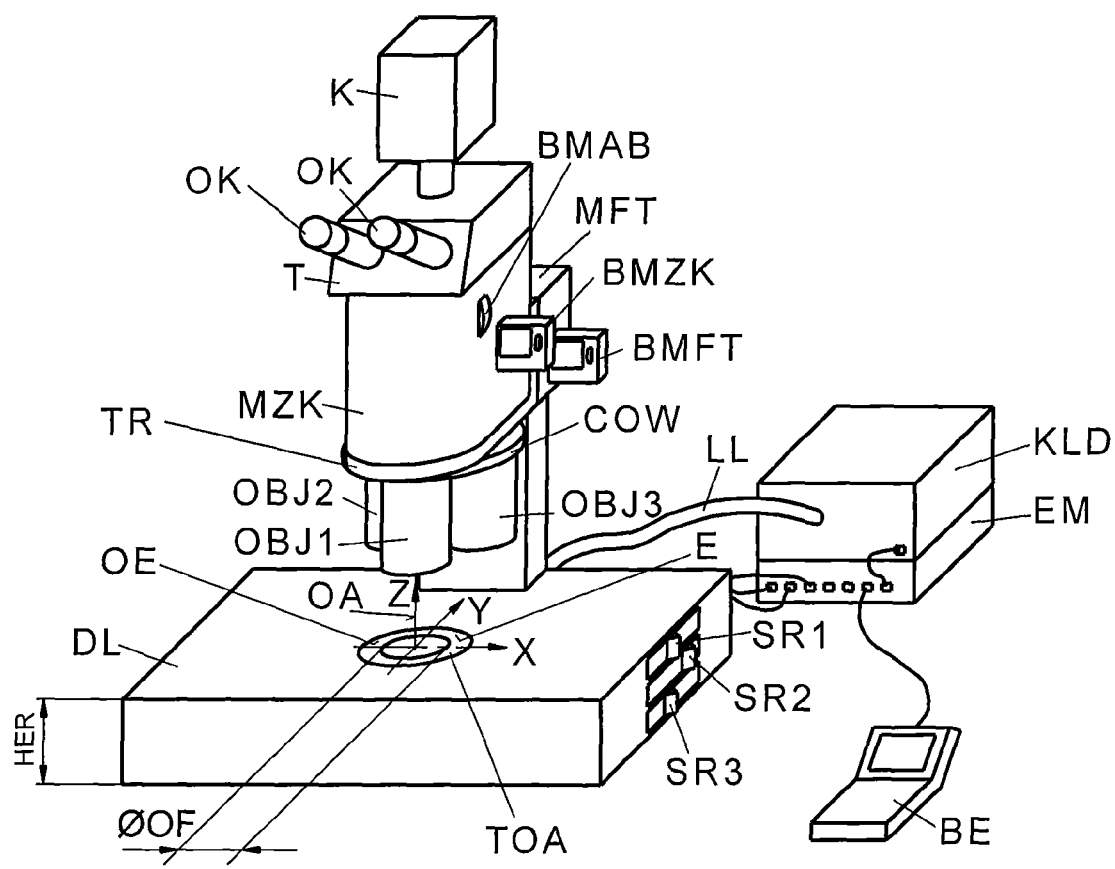
FIG. 1: shows a microscope system according to the prior art.
Figure 2:
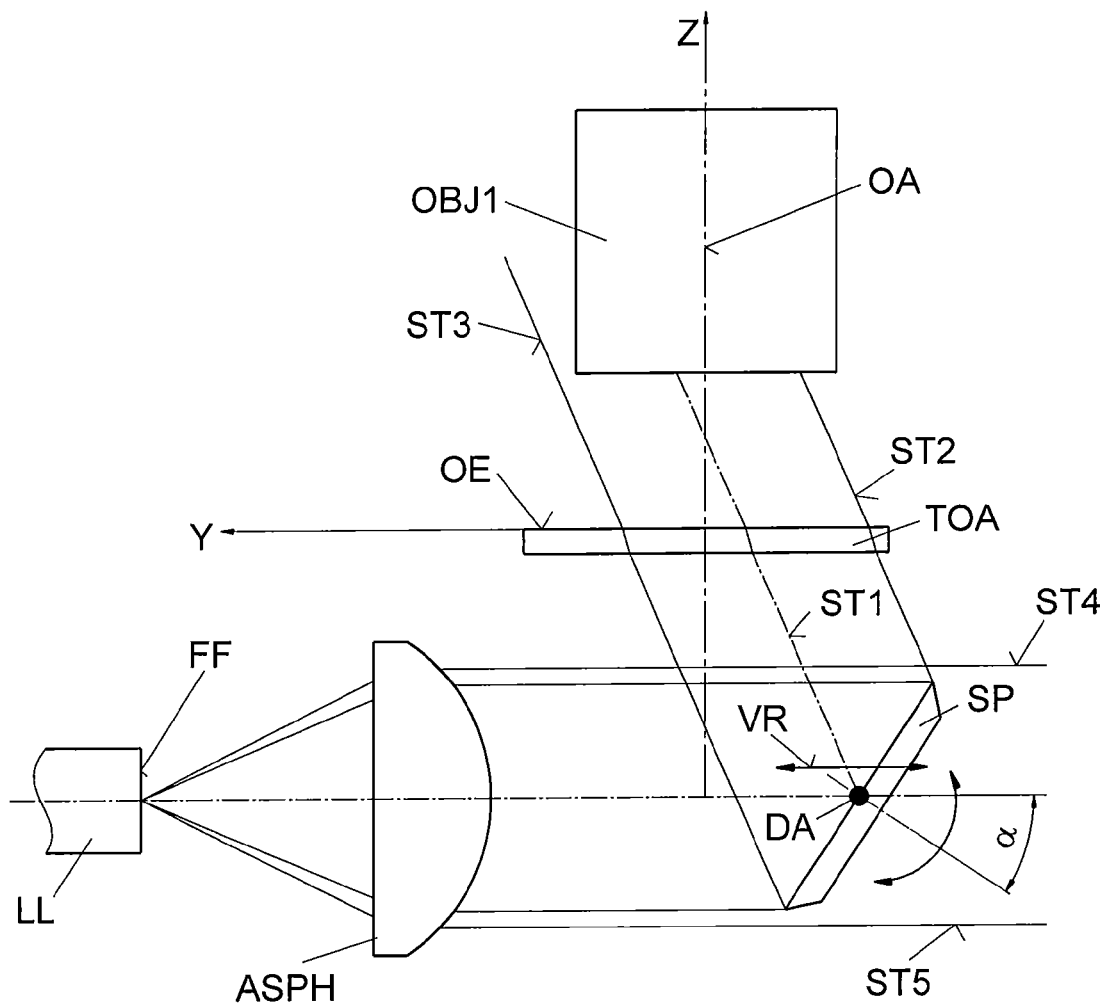
FIG. 2: shows a sketch to illustrate a transmitted light device according to the prior art.
Figure 3:
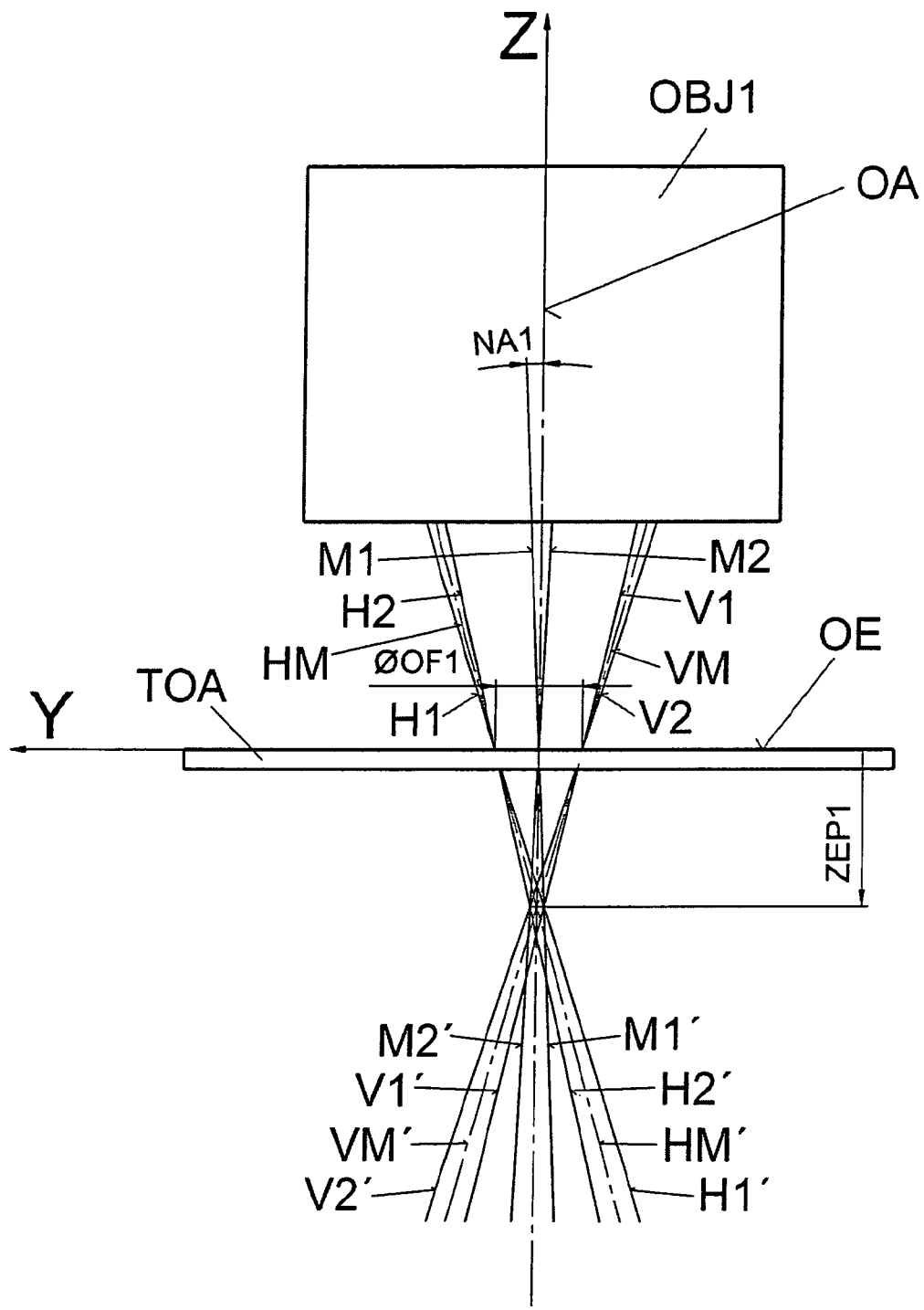
FIG. 3: shows essential components of the beam path in an apparatus according to the invention in a side view.

FIG. 3 shows the side view of the beam path with the objective OBJ1 of FIG. 1, which, together with the motorised zoom body MZK (not shown in FIG. 3) and the currently effective zoom factor $\beta$, has a numerical aperture NA1, an object field diameter OF1 in the object plane OE and a Z coordinate of the entrance pupil ZE1. The coordinate system thereby corresponds to that of FIG. 1.

From the known data of different objectives OBJ1, OBJ2, OBJ3, it is possible to determine and display for each objective the edge beams on the image side in combination with a motorised zoom body MZK, in dependence upon the zoom factor $\beta$, together with the back-projection of these image-side edge beams into the illumination area.

Starting from the object plane OE, the boundary light beams are shown which are particularly relevant for the description of the illustration through the depicted lens OBJ1.

The light beams H1 and H2 as well as the middle light beam HM start from the rear object field edge, wherein the light beams H1 and H2 represent the theoretical aperture limitations of the objective OBJ1 as shown with the effective zoom factor $\beta$. Correspondingly the light beams V1, V2 and VM start from the front object field edge, whereby V1 and V2 identify the theoretical aperture limitations of the objective OBJ1 shown with the momentarily effective zoom factor $\beta$. VM is the middle light beam.

In practical use there is generally a transparent object support TOA which produces, due to the refraction index differences and thickness, a beam offset, thus an extension of the actually effective optical distances. Both the optical effectiveness of the transparent object support TOA with a thickness DG and a refractive index nG as well as the corresponding optical properties of the object OB with an object height OH and a refractive index nO must be considered. Local curvatures of the object OB and/or refractive index fluctuations, for example through air bubbles inclusions, also lead to a change in the optical path and are to be considered in principle.

There is thus a beam offset SV in Z direction which can easily be calculated on the basis of the known properties of TOA, namely thickness and refractive index transitions and while disregarding the properties of the object OB.

The following formula applies in air:

$$SV=DG*(nG-1)/nG$$

In case of a typical thickness of for example DG=4 mm and nG=1.5, this results in a beam offset SV=1.3 mm.

This calculation applies, however, only for an idealised transparent object support TOA without an object OB and works on the basis of the known optical data. During practical use, the object OB is frequently surrounded by further media, for example Petri dishes with nutrient solutions. The object itself may also be optically inhomogeneous and/or may have local curved surfaces or inclusions, meaning that the correlations become even more complicated. The simplification mentioned above leads to errors which are non-negligible in many cases. The beam offset SV cannot thereby be correctly calculated in most cases. If one considers that the object support TOA has a non-negligible thickness DG, the object OB has an optically effective thickness and the pupil is not a well-defined planar surface in case of the usual zoom microscopes, this results in an effective entrance pupil, the distance of which from the object surface OE Zh1 is displaced with respect to the Z coordinate of the idealised entrance pupil ZEP1. This means that even Zh1 is not exactly known as a rule and must be empirically determined.

Instead of the objective OBJ1 shown in FIG. 3, one of the objectives OBJ2 or OBJ3 of FIG. 1 can also be used. These have, together with the motorised zoom body MZK and the actually effective zoom factor $\beta$, a different numerical aperture, a different object field diameter in the object plane OE and another Z coordinate of the entrance pupil. Due to the cost-optimised objective-zoom body combinations OBJ1 with MZK, OBJ2 with MZK and OBJ3 with MZK, typical in stereomicroscopy and macroscopy, there are no corrected pupil planes fixed over the zoom region and no guaranteed suitability for polarisation optical methods. The value of ZEP1 and the corresponding values ZEP2 and ZEP3 (not shown in FIG. 3) of the second and third objective-zoom body combination OBJ2 with MZK and OBJ3 with MZK lie correspondingly far from each other and move with the zoom factor $\beta$ as a rule with different strengths. When using a coded objective changer COW according to FIG. 1, it is possible for an identical object on an identical transparent object support TOA to be assumed for different objectives OBJ1, OBJ2 and OBJ3 in a stereo microscope system. Therefore, Zh1 and the corresponding values Zh2 and Zh3 (not shown in FIG. 3) of the second and third objective-zoom body combination OBJ2 with MZK and OBJ3 with MZK have corresponding differences. Due to the unclearly defined pupil positions Zh1, the differences are not compulsorily identical.

In addition, there are no defined entrance pupils which are fixed during zooming in the case of the described typical cost-optimised objective-zoom body combinations OBJ1 with MZK, OBJ2 with MZK and OBJ3 with MZK. The fulfilment of such a requirement would have clearly made the optical design and the objective construction more difficult. This would have led at least to the objectives being more expensive and to a possibly unacceptable construction size, even if a solution to this were found at all. There are thus in practice no planar fixed-location entrance pupils with the usual minimised image errors. The entrance pupils are thus greatly deformed and migrate upon variation of the zoom factor β and the position of the entrance pupils depends greatly upon the light wavelength.

In case of an image recorded through the right channel R of the objective OBJ1 with the arrangement according to FIG. 3, the contrast without further means is very weak, structures and/or phase differences are as good as unrecognisable. The image has, on the other hand, great homogeneity in relation to brightness.

By providing a diaphragm in the body of the transmitted light cover which can be displaced in the direction of the optical axis of the observation system, the recognisability of structures and/or phase differences can be improved. The diaphragm can be set with different zoom positions to the position of the effective entrance pupil of the optical system. Different contrast effects can be achieved through a displacement transverse to the optical axis.

Figure 4:
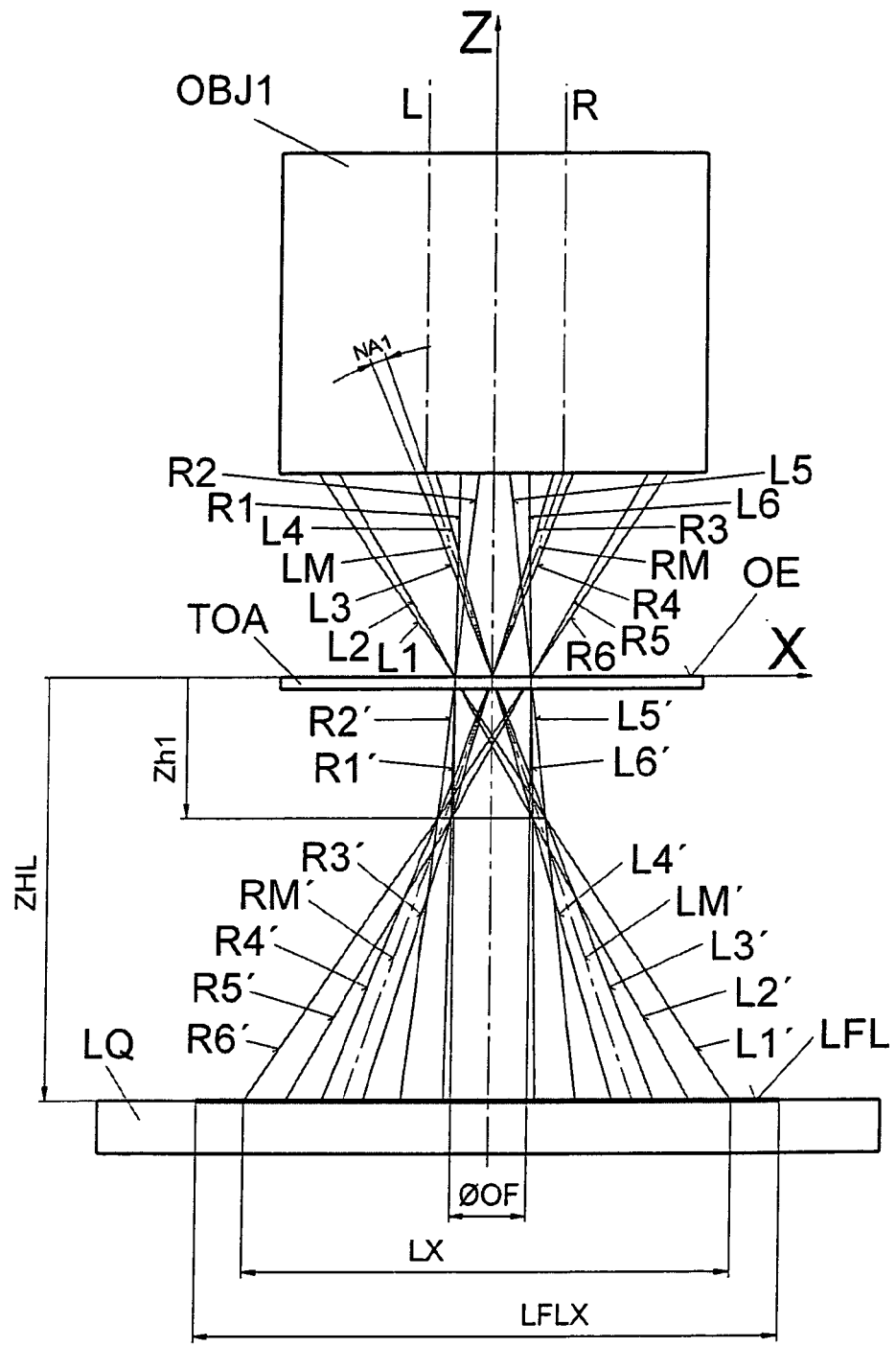
FIG. 4: shows essential components of the beam path in an apparatus according to the invention in a front view.
Figure 5:
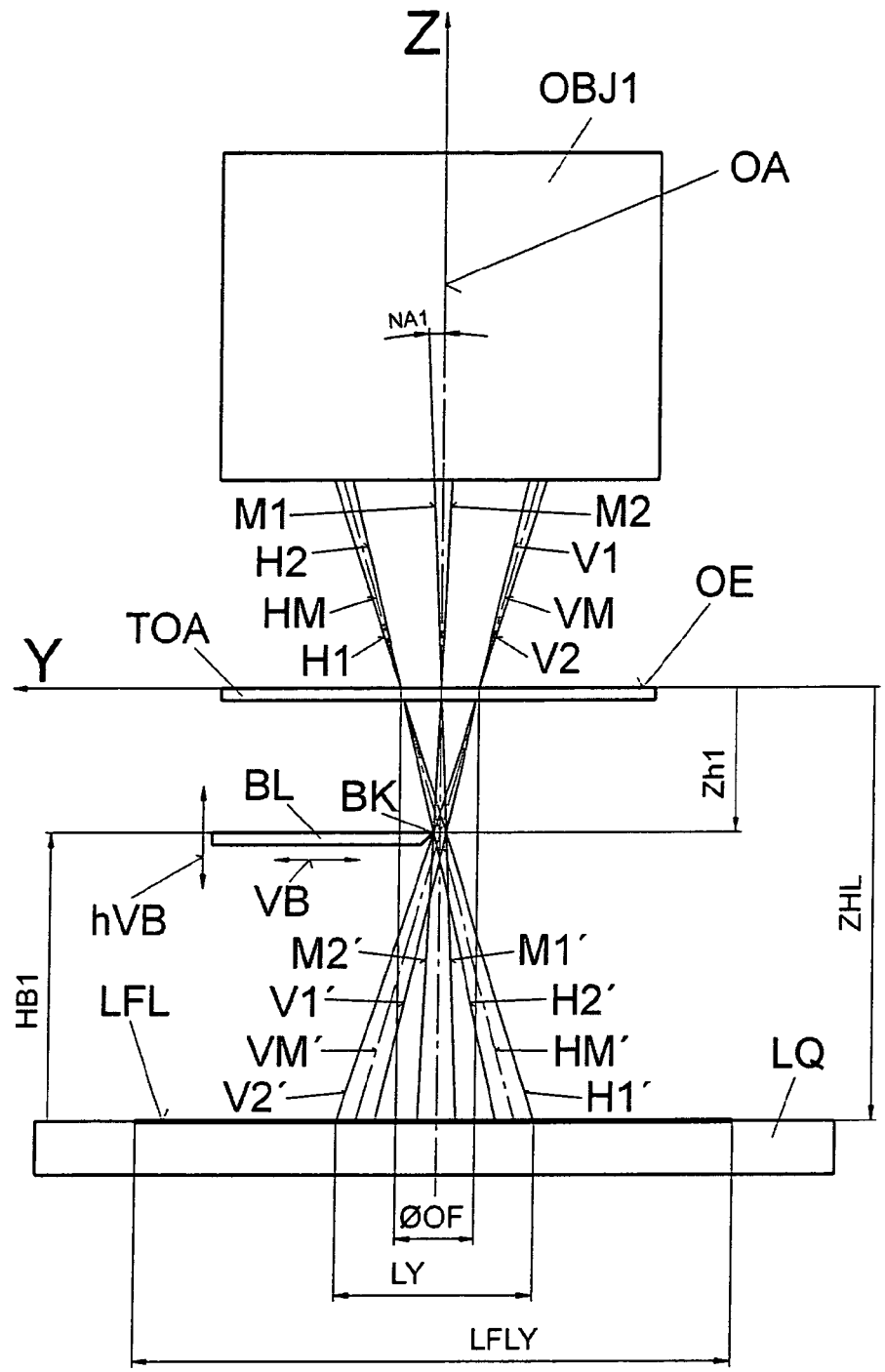
FIG. 5: shows essential components of the beam path in an apparatus according to the invention in a side view with a diaphragm edge.

FIG. 4 shows the front view, FIG. 5 the side view from the left of an arrangement according to the invention. FIG. 5 shows the boundary light beams starting from the object plane OE or the top side of the transparent object support TOA, which boundary light beams are particularly relevant to the description of the imaging of the depicted objective OBJ1. In FIG. 4, R1 to R6 denote right light beams and L1 to L6 denote left light beams.

The light beams H1 and H2 and the middle light beam HM come from the rear object field edge, wherein the light beams H1 and H2 represent the theoretical aperture limitations of the depicted objective OBJ1 with the momentarily effective zoom factor β. NA1 refers to the objective aperture of the objective OBJ1 in FIGS. 4 and 5.

Similarly, the light beams V1, V2 and VM come from the front object field edge, wherein V1 and V2 identify the theoretical aperture limitations of the objective OBJ1 shown with the currently effective zoom factor V1 and V2. VM is the middle light beam.

All light beams projected back into the illumination space retain their own name. Merely an apostrophe is added to indicate consideration of the beam offset SV. The middle light beams in the image space VM and HM thus result, in consideration of the beam offset through the transparent object support TOA, in the light beams VM' and HM' projected back into the illumination space. In FIG. 5, M1 and M2 identify middle light beams.

According to the invention an adjustable diaphragm BL with a diaphragm edge BK is arranged in the installation space between the object plane OE or the upper side of the transparent object support TOA and the light surface LFL of a light source LQ. This diaphragm BL can be adjusted in height, i.e. set along the shift direction hVB in such a way that the diaphragm edge BK lies in an ideal Z diaphragm position Zh1 for the currently active objective OBJ1 in combination with a zoom body MZK, on which a current zoom factor β is set. It can be seen in FIG. 5 that this setting has already taken place, wherein this is only an idealised representation for the purpose of illustration of the principle.

As already set out, the entrance pupils of most objectives are not fixed in position on zoom systems, mainly for cost reasons, and do not comply with any special quality requirements. This leads to the position and form of the entrance pupil not being clearly defined. It is in part also highly dependent upon the light wavelength. The actual beam path is thus clearly more complex and correspondingly complicated to illustrate. In order to describe the main mode of operation, therefore, only the idealised beam path is used.

Due to the abovementioned complex conditions and further unknown influences of the object OB and its environment such as for example the transparent object support TOA, Petri dish with nutrient solution, practical trials to determine and/or set the ideal Z diaphragm position Zh1 are indispensable. Mainly on account of the unknown influences of the object OB and its environment, a suitable operating element is preferably provided, for example an adjust scroll wheel SADJ, is provided to allow the client to vary the diaphragm position perpendicular to the object plane OE.

The ideal diaphragm position is characterised in that at least one diaphragm BL can be freely positioned with at least one linearly extending diaphragm edge BK between the light source LQ and the object plane OE parallel to the surface normal of the object plane OE in the direction hVB and in at least one direction VB perpendicular thereto. The diaphragm BL with diaphragm edge BK can thus be brought through movement in direction hVB of the surface normal of the object plane OE in order to homogenise the illumination into an ideal diaphragm position Zh1, in which it can be optimally adjusted to the currently effective imaging system. The imaging system comprises a zoom body MZK with the current zoom factor β, an objective OBJ1, an object OB and possibly a transparent object support TOA. The contrast strength can be adjusted by displacing the diaphragm BL with the diaphragm edge BK perpendicular to the surface normal of the object plane OE in the direction VB, wherein the diaphragm edge BK is orientated parallel to the object plane OE and perpendicular to the displacement direction VB for the contrast level variation. In principle, no further means for homogenisation of the lighting are provided or required.

When the ideal Z diaphragm position Zh1 has been set, the distance between the lighting surface LFL and the diaphragm BL is then HB1; the distance ZHL results according to FIG. 5 from ZHL=ZH1−HB1.

It can be seen in FIGS. 4 and 5 that the light area LFL of the light source LQ has an extension LFLX in X direction and IFLY in Y direction. For a vignetting-free homogeneous illustration using the objective OBJ1 shown with the momentarily effective zoom factor β, however, only the light area extensions LX in X direction and LY in Y direction are required.

Ideally, the light field dimensions LFLX and LFLY are selected to be at least large enough to allow a vignetting-free homogeneous lighting for each objective under all imaging conditions arising. The form of the light area can hereby be adapted to the actually effective back-projection of the light beams. This then results approximately in an ellipsis with large half-axis in the X direction during 3D observation, or a circle during 2D observation. 2D observation is hereby intended to mean single-channel observation of the sample. 3D observation is correspondingly observation with two channels.

By moving the diaphragm BL positioned at a distance Zh1 from the object plane OE or from the upper side of the transparent object support TOA in the displacement direction VB, the diaphragm BL can be brought into the illumination beam path with the diaphragm edge BK in such a way that certain light beams can be filtered out. The diaphragm is preferably moved along the Y axis as it then acts for the left channel L and the right channel R equally. FIG. 4 shows that a movement of the diaphragm (not shown) at a distance Zh1 in the X direction would not filter out the light beams of the two channels evenly. This would result in unsuitable illumination for 3D images. If the diaphragm BL with the diaphragm edge BK is brought into the illuminating beam path according to FIG. 5, that is to say by moving at a distance Zh1 from the object plane OE or from the top side of the transparent object support TOA, in the displacement direction VB, it does not only act on both channels evenly but instead also on all points of the object field.

According to the arrangement of the diaphragm BL in FIG. 5, the diaphragm edge BK contacts the back-projected light rays V2' and H2' which come from the opposing object field edges. All back-projected light beams are thus contacted between the opposing object field edges by the diaphragm edge BK. If the diaphragm BL is pushed further into the illumination beam path, this results in an even cover of illuminating light beams over the object field, that is to say the lighting remains homogeneous with decreasing brightness, whereby the contrast clearly improves. This was confirmed through practical trials.

Figure 6:
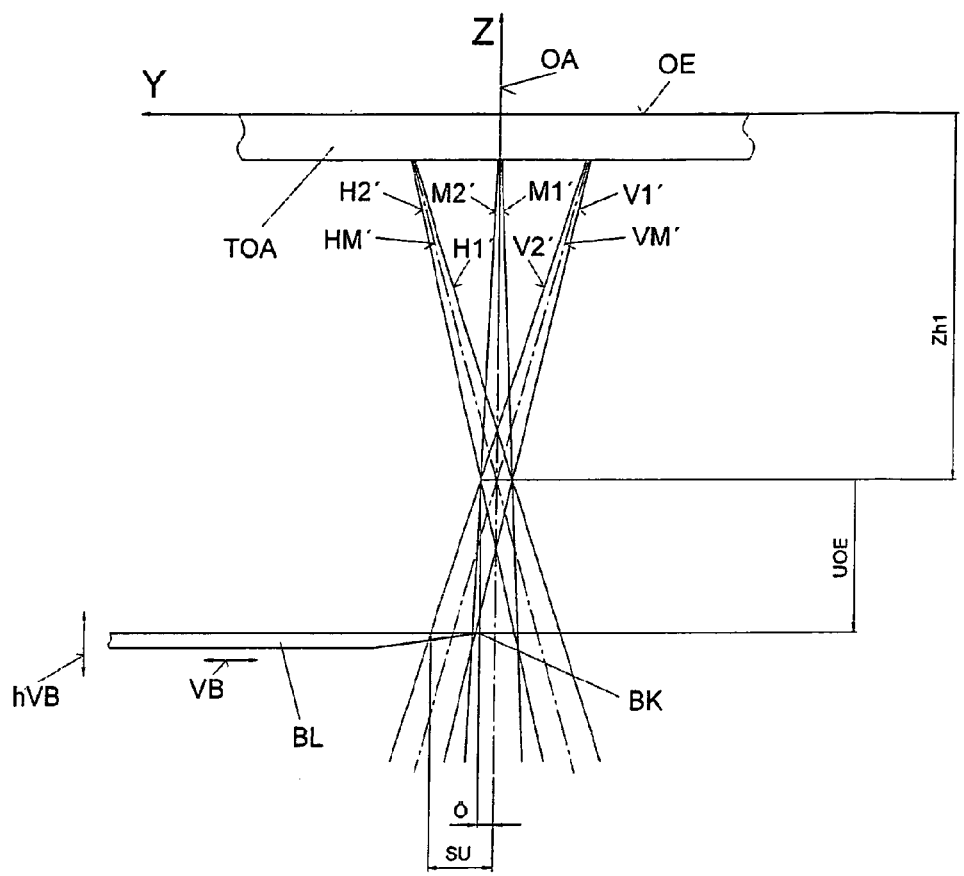
FIG. 6: shows in a side view a situation in which the diaphragm edge is further away from the objective plane than the effective entrance pupil.
Figure 7:
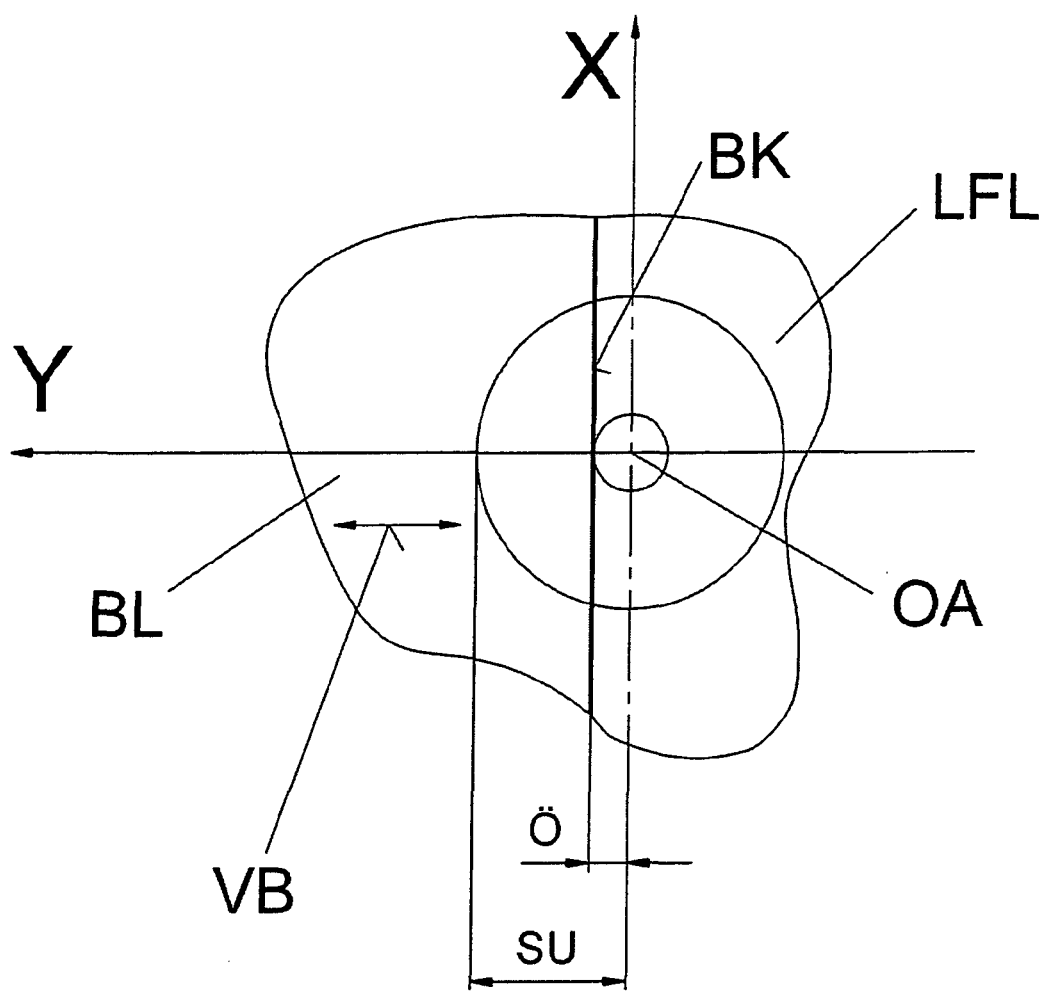
FIG. 7: shows, in a top view, the situation of FIG. 6.

FIGS. 6 and 7 show detailed views of the apparatus according to the invention for transmitted light illumination, whereby the diaphragm edge BK in direction VB parallel to the object plane OE is at the edge of the beam cross-section, which is characterised by the open distance Ö as a radius of the beam cross-section at the level of the ideal Z diaphragm position Zh1 around the optical axis OA. However, the ideal diaphragm position Zh1 is not set as the diaphragm BL is displaced with the diaphragm edge BK in the setting direction hVB by the displacement path UOE too far away from the object plane OE. The light beams V1', VM' and V2' are thereby completely filtered out. As all these light beams are to illuminate the front object field edge and as hardly any further light beams for illumination of the other object field are filtered out, only the front object field edge appears dark, that is to say the image is non-homogeneous having regard to brightness.

In order to provide the diaphragm edge BK only on the outer edge of the beam cross-section in the diaphragm position Zh1+UOE set deviating from the ideal Z diaphragm position Zh1, it would have to be opened further onto the opening space SU. As the diaphragm BL with the diaphragm edge BK would not, however, then be in the ideal Z diaphragm position Zh1, the function of the contrast method according to the invention would no longer be provided.

Figure 8:
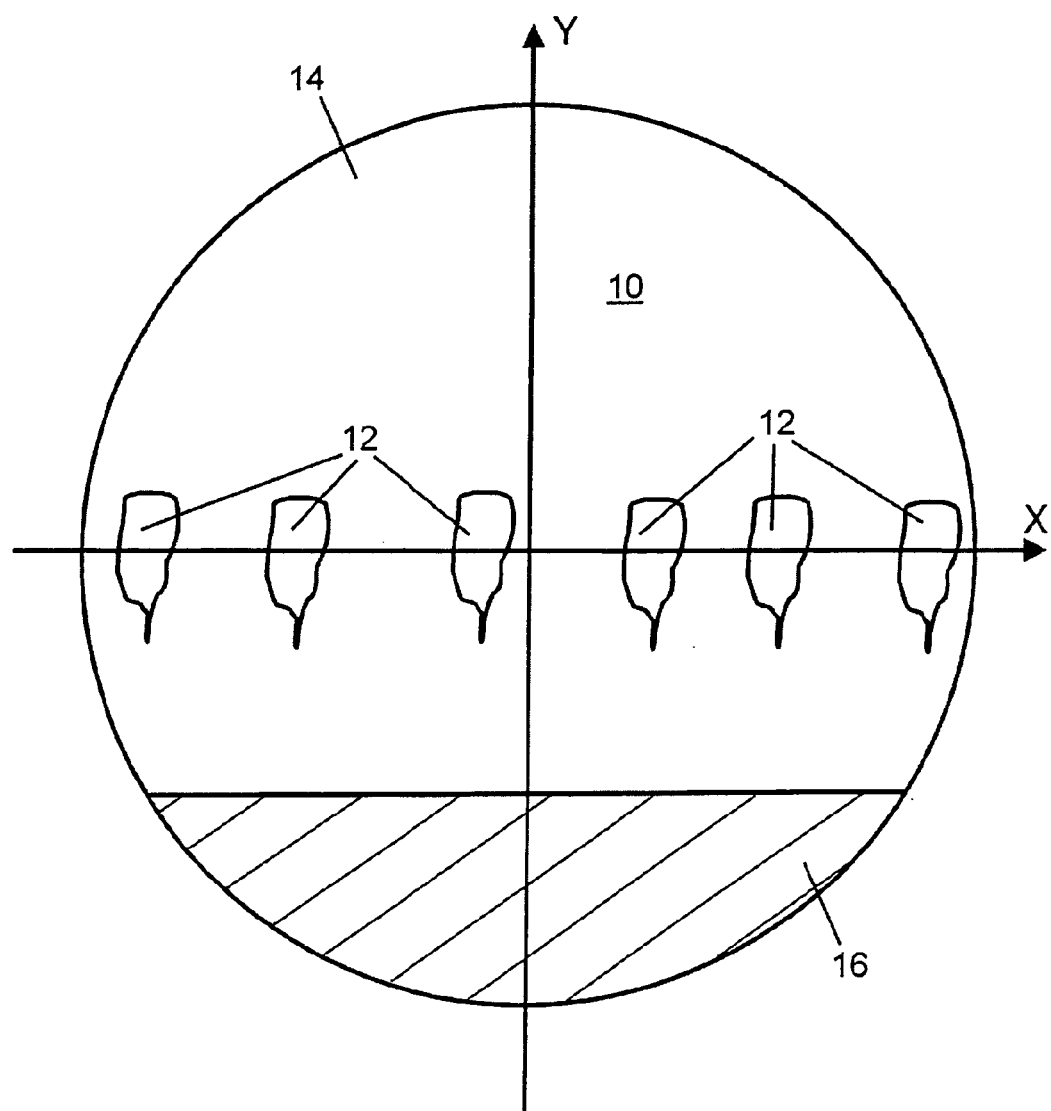
FIG. 8: shows, in a schematic illustration, a microscope image which is obtained if the diaphragm edge is too far away from the object plane.

FIG. 8 shows schematically the image of a camera K which has been taken by the objective OBJ1 with the arrangement according to FIGS. 6 and 7. For the purpose of orientation the XY coordinate axes are included from the object plane OE.

The image seen by the camera in FIG. 8 is identified with the reference numeral 10 and the sample OB with the reference numeral 12. If the diaphragm edge BK is further away than the entrance pupil from the object plane, the image darkens from the negative y direction. The brightness differences are schematically illustrated in the image of the camera K in FIG. 8. The lower image edge 16, that is to say the front region of the object field in the negative half space of the Y axis, appears dark. The image becomes brighter towards the top image edge 14.

The brightness non-homogeneities caused by the deviations with respect to the ideal diaphragm position Zh1, which can be seen in the image of the object plane OE parallel to the setting direction VB of the diaphragm BL, can be described through a brightness gradient which includes a direction indication, describable through a +/− sign and an absolute value. For example the brightness gradient has a negative sign when the diaphragm BL is too close to the object plane OE and a positive sign when the diaphragm BL is too far from the object plane OE. The absolute value identifies the degree of deviation, that is to say an increasing absolute value describes an increasing deviation from the ideal Z diaphragm position Zh1. The purpose of setting the ideal Z diaphragm layer Zh1 can thus be achieved in that the absolute value is minimised, whereby the +/− sign of the brightness gradient supplies the information for the required movement direction in order to reduce the absolute value.

The advantages according to the invention are achieved in a special way if the diaphragm edge is positioned in a plane of the effective entrance pupil of the objective. The invention provides in particular a method, with which this position, which can also be described as an optimal position, can be found and set. A position of the diaphragm edge is thus determined by initially varying the position of the diaphragm edge in the direction of the optical axis of the objective and for each position of the diaphragm edge in the direction of the optical axis a microscopic image is at least partially recorded. For each microscope image, an illumination parameter is thus determined and the position of the diaphragm edge in the direction of the optical axis, in which a progression of the illumination parameter plotted against the position of the diaphragm edge in the direction of the optical axis has a predetermined characteristic, is set as an optimal position of the diaphragm edge or as a position of the diaphragm edge in the plane of the effective entrance pupil. The thus fixed position can be stored and the diaphragm edge can be moved into the thus found position.

This feature can then be recorded for each relevant zoom position of the microscope. Intermediate regions can be interpolated later.

By way of an illumination parameter, a value is preferably selected which is a measure for an intensity or brightness gradient in a direction perpendicular to the diaphragm edge, a local image contrast, a local contrast periphery of the image, a local image homogeneity and/or a local shadow in the microscope image.

This determination of the optimal position of the diaphragm edge is based upon the fact that during positioning of the diaphragm edge in the entrance pupil, all bundles of illuminating light beams contributing to the image are in principle equally influenced by the diaphragm edge in that the diaphragm edge removes unilaterally certain beams of each bundle of illuminating light beams. In contrast, if the diaphragm edge is positioned outside of the plane of the entrance pupil, different bundles of light are differently influenced. For example certain bundles of light are completely filtered out, and this can consequently be seen as a dark area in the image. The ideal position of the diaphragm edge is thus characterised by the image being very homogeneous in relation to the brightness and contrast.

In case of a particularly preferred variant, an intensity gradient is accordingly determined for each microscope image as a illumination parameter and the diaphragm edge is set to the position in the direction of the optical axis, in which a progression of the intensity gradient entered against the position of the diaphragm edge in the direction of the optical axis has a zero passage.

In order to create an appropriate termination condition for the method it is possible to ascertain, for the decision whether the intensity gradient experiences a zero passage, whether the intensity gradient is smaller than a meaningfully set threshold. The threshold can thereby depend upon the concrete optical configuration.

The microscope images are thereby advantageously recorded with a digital camera and the illumination parameter, for example thus the intensity gradient, is determined by evaluating the data supplied by the digital camera. This can be carried out with a computer in the control device or connected to the control device.

In order to effectively carry out the method for determining the optimal position, it is possible, on the basis of a illumination parameter, which has been determined for a previous position of the diaphragm edge in the direction of the optical axis, to decide upon the next position of the diaphragm edge in the direction of the optical axis to be fixed, wherein the next position is further away from the previous position with increasingly great illumination parameter determined for the previous position. A direction in which the next position is spaced apart from the previous position is determined from a +/− sign of the illumination parameter determined for the previous position.

The basic idea of this method variant is that the optimal position is further away if the illumination parameter determined for a previous position has still a comparatively large absolute value. In order to arrive rapidly at the optimal position it is then useful to carry out the next determination of the illumination parameter for a comparatively remote position. On the other hand one is already very close to the optimal position if the illumination parameter determined for a previous position has a small absolute value. In this case the following position is very close to the previous position.

Figure 9:
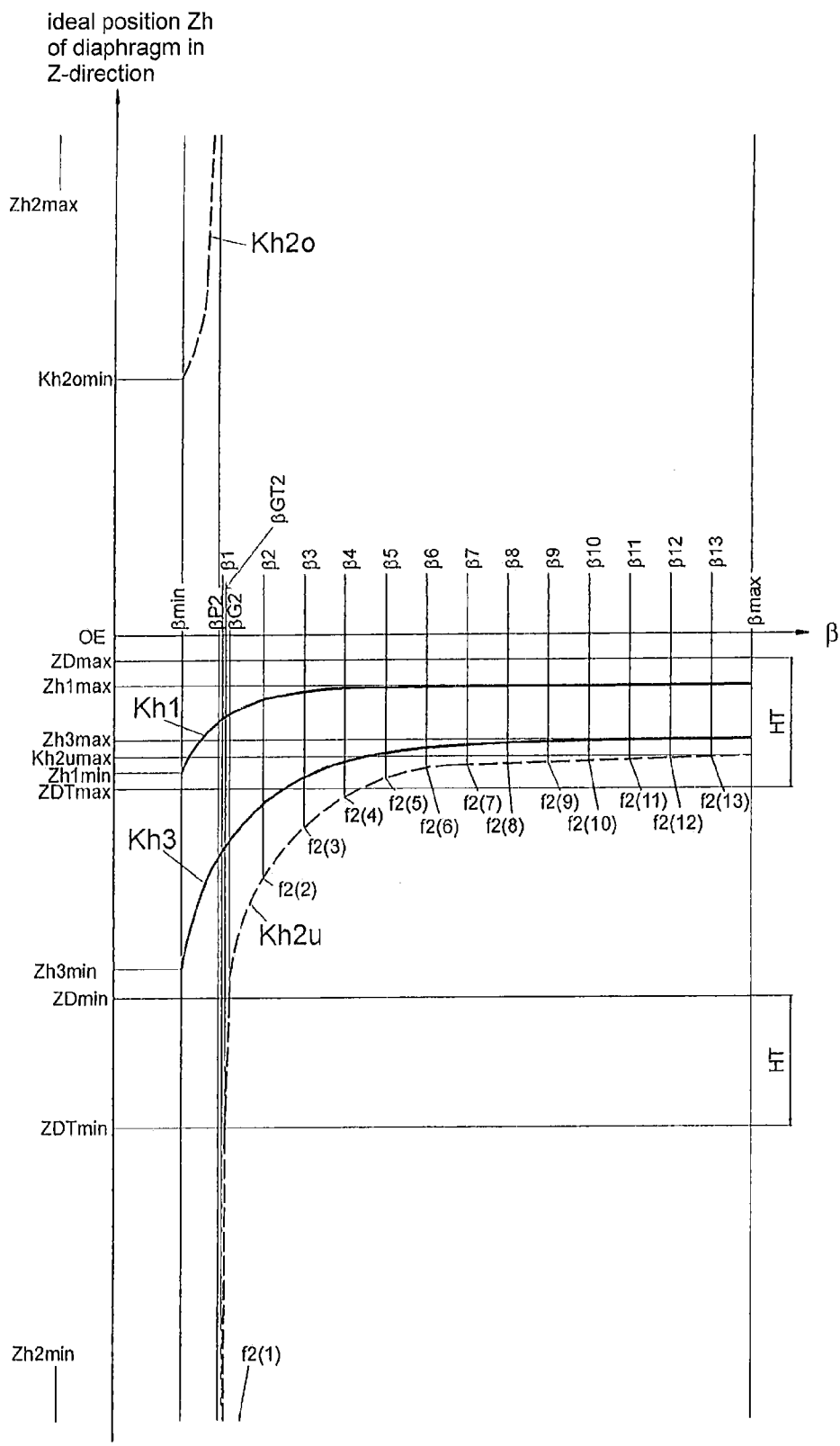
FIG. 9: shows a diagram, in which the optimal positions for the diaphragm edge are shown in dependence upon the zoom factor.

FIG. 9 shows by way of example the determined curves Kh1, Kh2o with Kh2u and Kh3 for the ideal Z diaphragm positions Zh to the three objectives OBJ1, OBJ2, OBJ3 of FIG. 1 in dependence upon the zoom factor β of the motorised zoom body MZK used in relation to the XYZ coordinate system, of which the origin lies in the object plane OE. The curves respectively begin with the smallest zoom factor β min and end at the largest zoom factor βmax of the zoom body MZK of FIG. 1.

Ideal diaphragm positions in Z direction for magnifications β1, β2 to β13 are indicated with f2(1), f2(2) to f2(13) and these have been determined with the objective OBJ2 on the motorised zoom body MZK.

Without a sample support table the ideal Z diaphragm positions of the two curves Kh1 and Kh3 of the corresponding objectives OBJ1 and OBJ3 lie, with typical curve form in the XYZ coordinate system between ZDmin and ZDmax which corresponds to the region, in which a height-adjustable diaphragm can be constructively realised. These boundaries thus characterise the usable installation space for the contrast method according to the invention within the contrast device DL according to the invention. In normal use, the uppermost diaphragm position ZDmax is defined by the transparent object support TOA in the transmitted light device DL. The diaphragm may not contact the transparent object support TOA from below under any circumstances. The lowermost diaphragm position ZDmin results from the limited construction height HER of the transmitted light device DL in FIG. 1, which must remain below a certain height for ergonomic reasons. The housing of the transmitted light device DL of FIG. 1 has a height HER of approximately 100 mm. A transmitted light illumination device DL without further accessories should not be higher.

The minimum ideal Z diaphragm positions of the curves Kh1 and Kh3 are called Zh1min and Zh3 min. Accordingly the maximum ideal Z diaphragm positions of these curves are called Zh1max and Zh3max. The minimum ideal Z diaphragm position of the upper curve section Kh2o is identified by Kh2omin and the maximum ideal Z diaphragm position of the lower curve section Kh2u with Kh2umax.

The objective OBJ2 of FIG. 1 has in principle a different curve progression which is typical for certain objectives OBJ. It can be seen in FIG. 9 that the curve for the objective OBJ2 comprises two curve sections Kh2o and Kh2u. Between these curve sections, in case of a zoom factor βP2, there is a pole position, i.e. the curve progression springs here from the top curve section Kh2o from plus infinity to the lower curve section Kh2u towards minus infinity.

The minimum and maximum ideal Z diaphragm positions of the curve sections Kh2u and Kh2o, i.e. Zh2min and Zh2max, are thus infinite or lie practically so far apart that the corresponding ideal Z diaphragm position can no longer be constructively set. In the upper curve section Kh2o, the ideal Z diaphragm position is at any rate unreachable, as the diaphragm BL with the diaphragm edge BK would have to be arranged above the object plane OE. In the lower curve section Kh2u the ideal Z diaphragm layer can be initially ensured only from the zoom factor βG2 and is then precisely in the boundary position ZDmin. The described contrasting method between the zoom factors βmin and βG2 cannot therefore be used with all advantages. Another suitable contrasting method is preferably to be determined for this.

In addition, optimal diaphragm positions for a microscope system are shown in FIG. 9, in which a sample support table KT is placed on the apparatus for transmitted light illumination DL. Such a microscope system is initially described with reference to FIG. 10.

Figure 10:
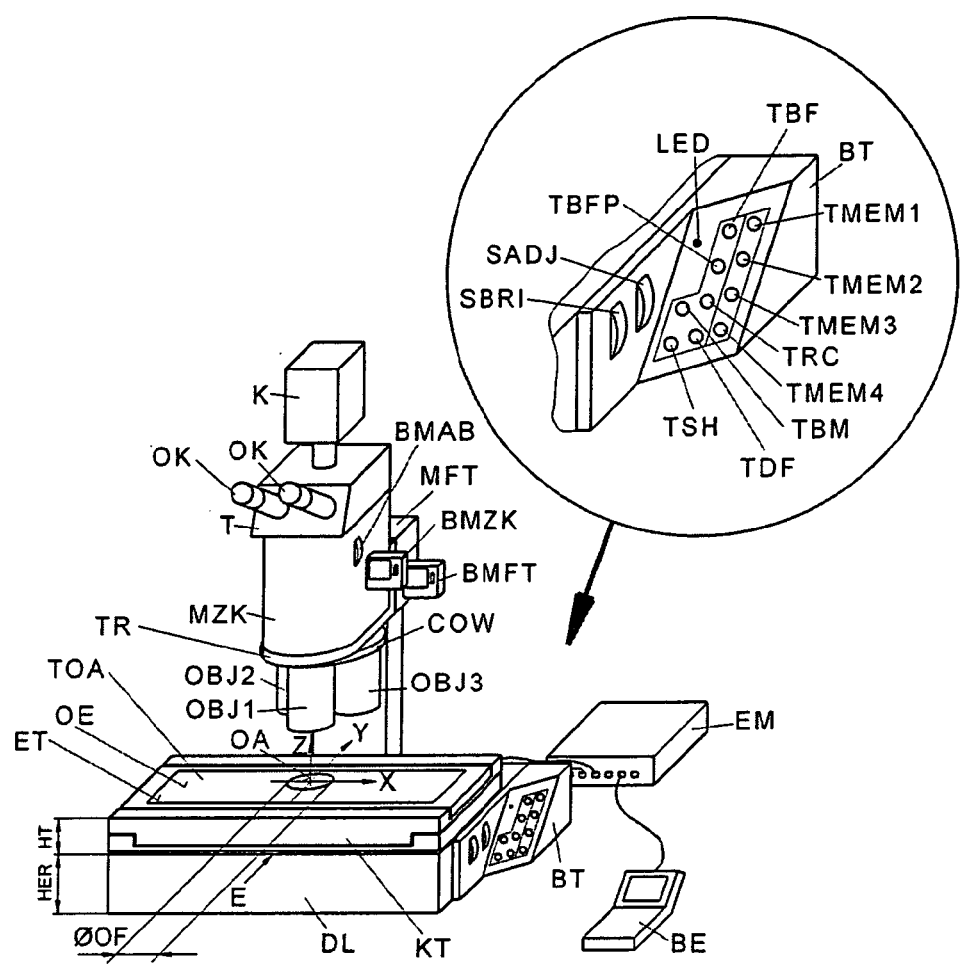
FIG. 10: shows a perspective view of a microscope system according to the invention with a light microscope and an apparatus for transmitted light illumination according to the invention.

FIG. 10 shows a perspective view of a microscope system according to the invention with a light microscope and an apparatus according to the invention for transmitted light illumination. The components shown correspond to those of FIG. 1 but a sample support table KT or, in short table KT, is placed additionally on the transmitted light device DL. The corresponding reference numerals of FIG. 1 apply here.

The table KT provides additional installation space for accessories. For example a ring light can be used within the table KT. In comparison with the light source LQ, the sample can be illuminated with the ring light at a very great angle of inclination, through which a dark field observation is particularly effectively possible.

In order to assemble the table KT on the apparatus for transmitted light illumination, the latter has assembly means, for example a form with recesses, into which a lower region of the table KT engages.

Through the additional table KT the object plane OE is moved from plane E into plane ET, i.e. by the distance HT upwards. As the origin of the XYZ coordinate system lies according to definition in the object plane OE, the origin of the XYZ coordinate system in FIG. 10 is thus displaced in relation to FIG. 1 likewise by the distance HT upwards, that is to say in the direction of positive Z values.

In the graph of FIG. 9, the idea of ideal diaphragm position means that the usable installation space can be displaced, without further measures, by the same amount HT downwards, i.e. in the direction of negative Z values. Having regard to the old XYZ coordinate system according to FIG. 1, the boundaries ZDmin and ZDmax for the installation space usable inside of the apparatus according to the invention for transmitted light illumination are obtained. The coordinates of this usable installation space with a table KT in the new XYZ coordinate system are downwardly displaced by HT in relation to the coordinate system of FIG. 1 without a table. The lowermost possible ideal Z diaphragm position is with the table thus ZDTmin instead of ZDmin without a table and the possible uppermost ideal Z diaphragm position is with table ZDTmax instead of ZDmax without table.

The applicability of the contrast method according to the invention thus changes under certain circumstances. For this method, only those curve regions of the curves Kh1, Kh2o, Kh2u and Kh3 which lie in the aforementioned usable installation space can be used, i.e. in a region in which the setting of the ideal Z diaphragm position can be constructively realised.

The installation space within the table KT, thus the Z value range between ZDTmax and ZDmax, is also to be usable as far as possible for the diaphragm. An apparatus designed for this purpose according to the invention for transmitted light illumination is described below with reference to FIG. 11.

Figure 11:
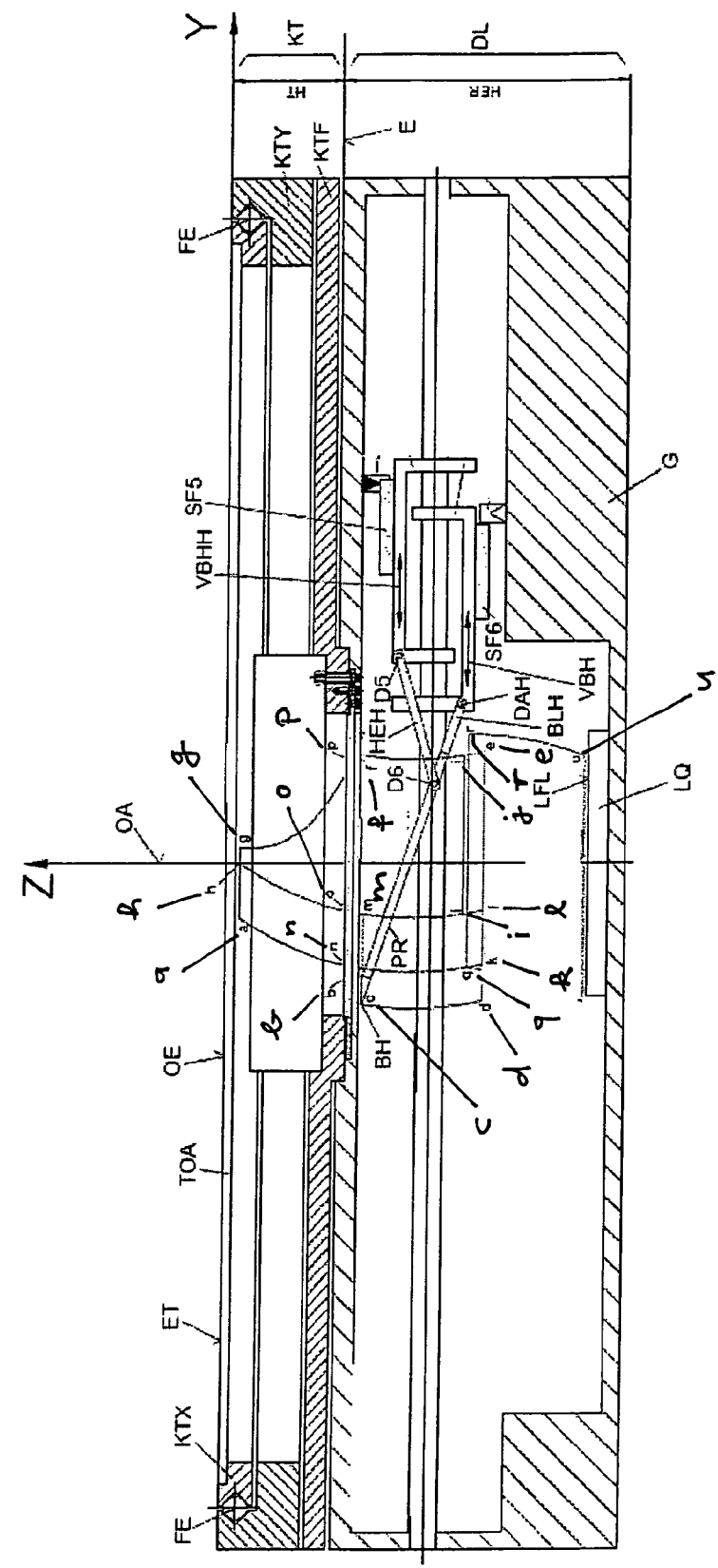
FIG. 11: shows an exemplary embodiment of an apparatus according to the invention with a diaphragm and a set-up sample support table.

FIG. 11 shows an exemplary embodiment of an apparatus for transmitted light illumination DL according to the invention. This is shown in the right system, as seen by the user in FIG. 1, thus X axis to the right, Y axis backwards, Z axis upwards. The apparatus DL has a diaphragm BLH with a diaphragm edge BH running linearly in the X direction. The diaphragm BLH is arranged between a light source LQ, of which the light surface LFL is arranged parallel to the XY plane in the negative Z half space and the object plane OE. The object plane OE, on which a sample to be examined is found forms the coordinate origin.

The diaphragm BLH is rotatable around a rotation axis DAH, which is orientated parallel to the diaphragm edge BH and arranged on a first carriage, so that the diaphragm BLH with diaphragm edge BH together with the rotation axis DAH can be displaced along a guide path of the first carriage in the Y direction. The objective OBJ1 used comprises in principle the beam path of FIG. 3. Furthermore the correlations continue to exist which have already been described in relation to FIGS. 3 to 8. However, the diaphragm BLH which can be moved along a guide path has been displaced for a clear illustration so far into the negative Y direction that it engages into the beam cross-section of all back-projected edge beams. Of course, this arrangement according to the invention allows the diaphragm edge BH in Y direction to also be adapted to any beam cross-section, so that the diaphragm edge BH can work according to the invention.

For homogenisation of the illumination via a movement of the two carriages in the Y direction with superimposed relative movement of the two carriages, even without a change of the X and Y diaphragm coordinates, the diaphragm edge can also be brought into a Z diaphragm coordinate, in which it is optimally adapted to the currently effective image system which includes a zoom body MZK with the actual zoom factor β and an objective OBJ1. This can be recognized by a sufficiently homogeneous illumination. The diaphragm edge can be moved through the synchronous movement of the two carriages along the Y direction, that is to say parallel to the object plane OE, likewise in the Y direction and without changing the X and Z diaphragm coordinates. The contrast level of the illumination can thereby be set.

The apparatus for transmitted light illumination DL additionally has assembly means for an optional table KT. In the embodiment shown, along with this, a table KT is assembled on the housing G of the apparatus for transmitted light illumination. The upper housing wall G, i.e. the housing wall lying opposite the light source LQ, has a depression as a holding means for a sample at the level of plane E. With the mounted table, a holding device TOA is provided by the table KT at the level of the plane ET. Through the special design of the carriage element, the diaphragm BLH can be moved beyond the plane E of the original object support into the installation space below the table KT. Typical curve patterns of the end of the diaphragm edge BH with pure rotation about DAH are shown as lines d-c, q-n-a, l-m-h and e-p. Combined with a side displacement VBH, different coverage of the pupil can be achieved but this time within the inner space of the table KT.

Figure 12:
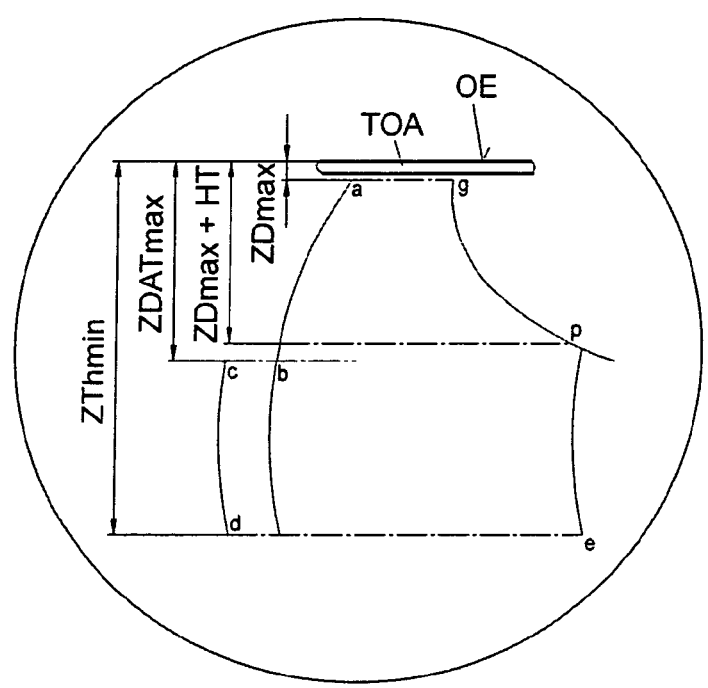
FIG. 12: shows an enlarged section of FIG. 11.

FIG. 12 shows, in an enlarged illustration, the contours of the travel curves of the diaphragm edge BH of the apparatus according to the invention of FIG. 11. The outer contour of the optically effective region of the diaphragm edge BH is characterised by the curve points d-c-b-a-g-p-e-d. If the effective pupil of the observation system lies close below the transparent object support TOA, the diaphragm edge with the apparatus according to the invention can be moved towards this point. Depending upon construction, ZDmax represents the Z coordinate of the uppermost diaphragm position. The Z value is hereby measured starting from the object plane OE. In order to avoid contact of the diaphragm with the transparent object support TOA, the amount of ZDmax is slightly greater than the thickness of TOA. Correspondingly ZDATmax constitutes the maximum Z coordinate when using an adapter plate AP, whereas ZThmin is the minimum Z coordinate of the diaphragm edge BH. The greatest possible Z coordinate without optional table of the height HT is identified in FIG. 12 by ZDmax+HT.

A second diaphragm (not shown) is preferably present which can be positioned at least in a region below ZThmin, thus below the positions d and e, as far as the light source LQ. If only a single diaphragm is present, this is preferably arranged and movable so that its Z position can lie in the whole region between the light source and the transparent object support of the optional sample support table.

The diaphragm edge BH can be freely positioned within the transmitted light illumination device DL in Z direction in the free installation space between the object plane OE and the light source LQ, see FIG. 11. On account of a tolerance-related safety distance, the lowermost actually realisable diaphragm position ZDmin lies just above the light area LFL with the Z coordinate ZHL. Upwards, the uppermost actually realisable diaphragm position ZDmax is not only determined by the thickness of the transparent object support TOA but also through the height of the optionally usable adapter plates AP, for example polarisation filter, including the support for this. The uppermost actually realisable diaphragm position ZDmax is hereby downwardly displaced by a corresponding tolerance-related safety distance.

According to the invention no further means for homogenisation of the illumination are provided or necessary.

Figure 13:
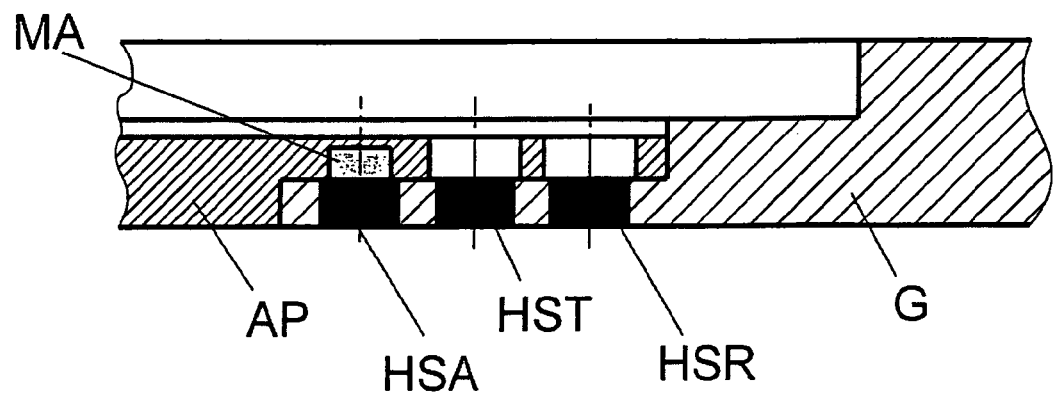
FIG. 13: shows a section of an apparatus according to the invention with means for recognising different attachments whereby an additional adapter plate is present.
Figure 14:
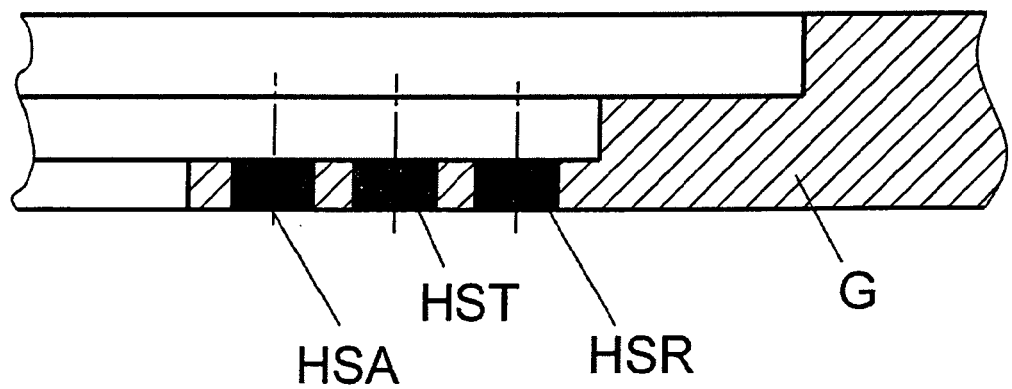
FIG. 14: shows a cut-out of an apparatus according to the invention with means for detecting different attachments, wherein no additional attachments are present.
Figure 15:
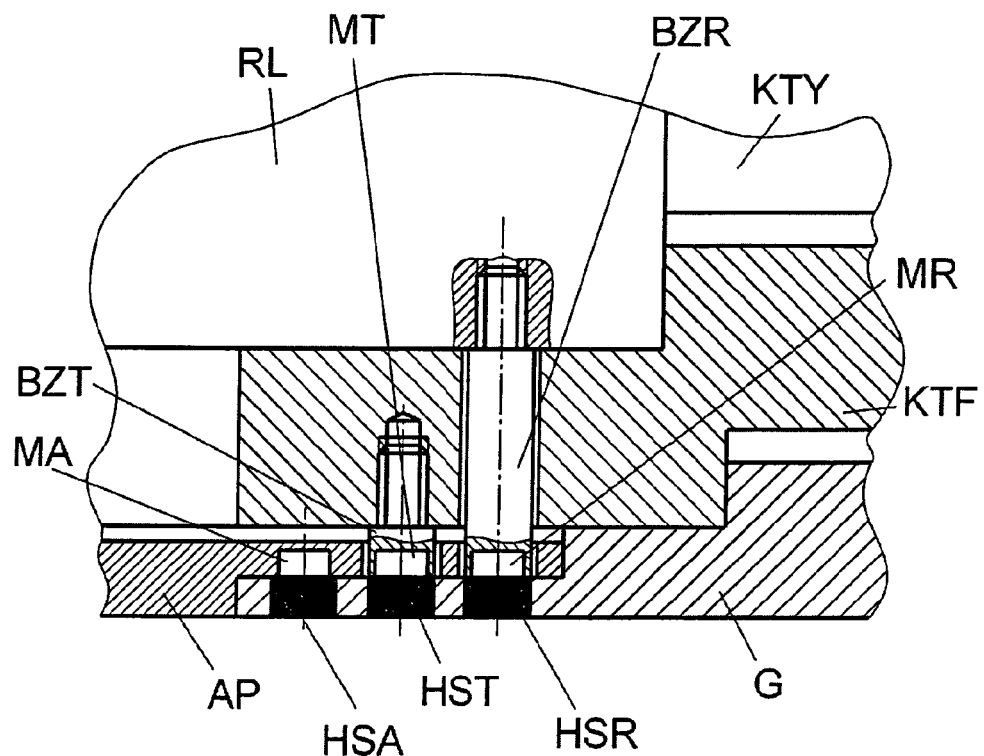
FIG. 15: shows a cut-out of an apparatus according to the invention with means for detecting different attachments, wherein an adapter plate, a sample support plate and a ring light are present.

FIGS. 13 to 15 show a cut-out of the housing G of the device for transmitted light illumination DL of FIG. 11. A region of the housing G is shown beside the passage opening. Means for recognising different attachments are provided on the housing G. These include at least means HST for determining the presence and in particular the identity of a sample support table KT, means HSA for determining the presence and in particular the identity of an adapter plate AP introduced into the passage opening and means HSR for determining the presence and in particular identity of accessories inserted in the sample support table KT such as a ring light RL. These means HSA, HST, HSR are shown in the example shown with Hall sensors HSA, HST, HSR.

The adapter plate AP, the table KT and the ring light RL have magnets MA, MT, MR, the presence of which can be determined by the Hall sensors HSA, HST, HSR.

If for example an adapter plate AP is introduced into the transmitted light cover DL, the Hall sensor HSA reacts via the magnet MA contained therein. The same applies correspondingly if the table KT is used with its magnet MT lying opposite the Hall sensor HST. The Hall sensor HSR serves with the magnet MR correspondingly for the detection of a ring light.

In order to fix the magnet MR to the ring light RL an auxiliary pin BZR is present on the ring light RL. Correspondingly, an auxiliary pin BZT is present on the table KT to fix the magnet MT to the table KT.

FIG. 13 shows an exemplary embodiment, in which an adapter plate AP is inserted into the passage opening. A magnet MA of the adapter plate AP is thereby positioned above the sensor HSA which thus recognises the presence and identity of the adapter plate AP. Due to the fact that no ring light RL or table KT are present in this embodiment, the sensors HST and HSR are not addressed.

In the situation shown in FIG. 14 on the other hand neither an adapter plate AP nor a table KT nor a ring light RL are present. Consequently none of the sensors HSA, HST, HSR reports the presence of these elements.

In the example shown in FIG. 15, both a table KT and a ring light and an adapter plate AP are present. By means of the magnets MT, MR and MA thereof, the Hall sensors HST, HSR and HSA register the presence of the table KT, ring light RL and adapter plate AP. The table KT has a base plate KTF with a passage. When the ring light RL is inserted, the magnet MR of the ring light RL projects through the passage as far as a detection region of the Hall sensor HSR. In addition a Y carriage KTY of the cross table KT is shown.

As recognised from these components, a control device according to the invention determines how great the maximum height adjustment of the diaphragm BH is. A collision with the lower side of the corresponding component is thus avoided.

According to the invention a safety mechanism can further be provided which guarantees that the diaphragm edge BH cannot be moved in a motorised manner, if for example the table KT has been removed and the diaphragm lies above the surface of the housing G. Alternatively, in this situation, the diaphragm edge can also be moved below the Z coordinate of the surface of the housing G. The user is thereby to be prevented from injuring himself through motorised movement of the diaphragm BH when the table KT has not been placed on the housing G.

The adjustment of the diaphragm edge in dependence upon the attachments recognised with the Hall sensors is described by reference to FIG. 16.

Figure 16:
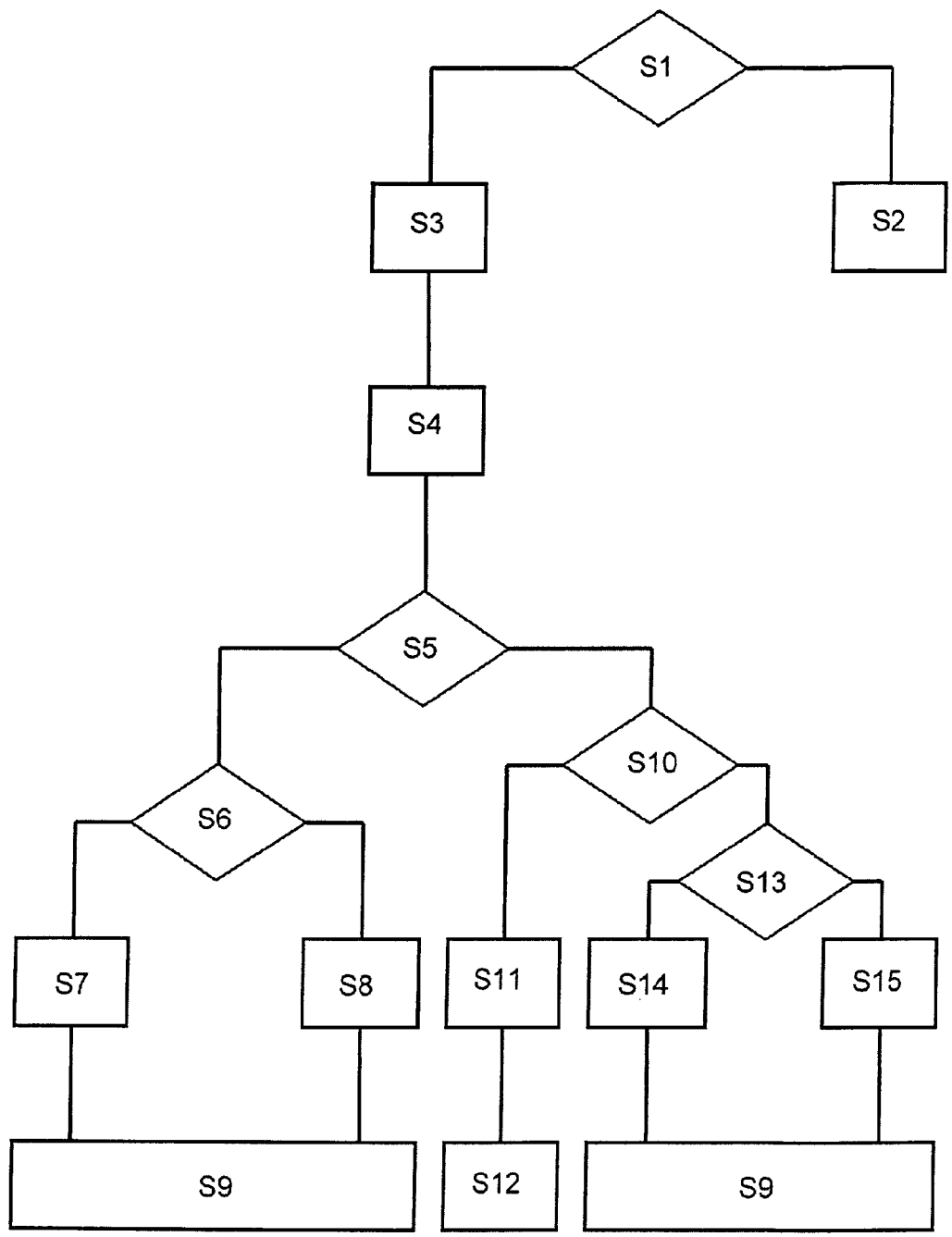
FIG. 16: shows a flowchart of a method according to the invention for setting a best possible illumination for a light microscope.

FIG. 16 shows schematically the method steps S1 to S15 of a method according to the invention for setting the most suitable illumination for a light microscope. The method according to the invention can be carried out in particular with an apparatus according to the invention for transmitted light illumination for a light microscope. The illumination is thereby adjusted by moving the diaphragm edges of an apparatus according to the invention to a suitable position.

The method according to the invention is explained using an exemplary embodiment with four diaphragms which respectively comprise a linear diaphragm edge. These four diaphragms are described as front, rear and two side diaphragms. According to the invention, however, a different number of diaphragms can be used. In particular an iris diaphragm can also be used. The method steps described below are then to be correspondingly adapted.

In step S1 it is checked whether a microscope setting, namely an objective-zoom body combination which is momentarily used in the light microscope and a zoom magnification associated therein can be called up. This can take place for example via a CAN bus. If the answer is "yes", step S3 follows, otherwise step S2.

In step S2 all available diaphragms are opened, that is to say none of the available diaphragm edges cuts the illuminating beam. In this connection the rear diaphragm is opened in that both associated carriages which serve for movement of the diaphragm are moved into the reference position of the rear diaphragm. The reference position of the rear diaphragm can be the accessible position which has the greatest Y value. The front diaphragm is similarly moved by moving both its two carriages into its reference position. Here, it is at the accessible position which has the smallest Y value. In addition the two side diaphragms are opened in that their respective reference positions are reached. For the first side diaphragm, this is the position with the minimum adjustable X value. For the second side diaphragm this is the position with the maximum adjustable X value.

In step S3, with the enquiry concerning the objective-zoom body combination and the zoom magnification set, an ideal Z position for a diaphragm edge is determined. This can take place for example with the aid of a stored value table, in which ideal Z positions for different objective-zoom body combinations and different zoom magnifications are stored. The value table can be determined by preceding measurements or through theoretical calculations. For zoom magnifications, for which no value is stored in the value table, an ideal Z position can be determined through interpolation of the values from the value table. The ideal Z position of the diaphragm edge can thereby be defined in that the lighting beam path of the light microscope has a waist at this Z position. Step S4 follows this step.

In step S4, the available installation space is determined. This constitutes a free movement space, in which the Z position of the diaphragm edges can be moved. A maximum Z position of the available installation space can be defined through additional means used. The minimum Z position of the available installation space can be a position directly beside the light source. The following indications relate to the variant of the apparatus according to the invention, in which, by way of additional devices, a sample support table KT, an adapter plate AP and a ring light RL can be used. The determination of the available installation spaces takes place with sensors, for example Hall sensors, in order to recognise said additional means.

If the sensors ascertain in step S4 that no additional device is used, the maximum Z position Zmax is fixed to a Z position ZDmax directly below the holding means TOA for the sample to be examined.

If the sensors in step 4 recognise that an adapter plate AP is used, the available installation space is limited to a Z position which lies directly below the adapter plate AP. This Z position can be described as ZDAmax if no sample support table is used and as ZDATmax if a sample support table is used. It is irrelevant whether a ring light RL is present in these cases for the determination of the available installation space, as the receiving position for a ring light RL is above the adapter plate AP.

If in step 4 a sample support table KT is recognised but neither an adapter plate AP nor a ring light RL are present, the maximum Z position Zmax is fixed to a Z position ZDmax which is directly below the holding device TOA of the sample support table KT.

If on the other hand it is ascertained in step S4 through the sensors that, besides the sample support table KT, also a ring light RL but no adapter plate AP is present, the maximum Z position Zmax is fixed to a Z position ZTRmax which is located directly below the ring light RL.

Step S4 is now complete and step S5 follows. In step S5 it is checked whether the ideal Z position of the diaphragm edge determined in step S3 lies within the available installation space determined within step S4. If this applies, step S6 follows, otherwise step S10.

It is ascertained in step 6 which of the available diaphragm edges can be moved to the ideal Z position. Depending upon the embodiment of the apparatus according to the invention, not a single diaphragm can be moved over the whole available installation space. Instead the front diaphragm can be moved into a region of lower Z values to maximum Zmin+HBVmax, while the rear diaphragm can be moved in a region of greater Z values than Zmin+HBVmax. HBVmax thereby describes the maximum height distance which the front diaphragm of the light area can assume. If it is determined in step S6 that the ideal Z position of the diaphragm edge lies in the movement area of the front diaphragm, step S7 then follows. If on the other hand the ideal Z position lies in the movement area of the rear diaphragm, step S8 follows. In practice the movement areas of the front and rear diaphragm might overlap. Nonetheless, a diaphragm is selected in step S6 according to the abovementioned criteria.

In step S7 the front diaphragm is moved to the ideal Z position and the rear diaphragm is opened.

In step 8 on the other hand the rear diaphragm is moved to the ideal Z position and the front diaphragm is opened. The opening can thereby take place as described in step S2.

In case of embodiments of the apparatus according to the invention, in which precisely one height-adjustable diaphragm edge is present, the steps S6 to S8 can be replaced by the step that this height-adjustable diaphragm edge is moved to the ideal Z position.

Step S9 follows both step 7 and step 8. In step S9 the two side diaphragms are positioned. The position thereof is determined—similarly to step 3—depending upon the objective-zoom body combination used and the zoom magnification thereby set. The two side diaphragms are then moved to the appropriate positions. The setting of all the available diaphragms and thus also the method according to the invention are hence complete.

Step S10 is described below. This is carried out if it is ascertained in step S5 that the ideal Z position of the diaphragm edge lies outside of the available installation space. It is determined in step S10 whether the use of a prism film is meaningful. If a prism film is introduced at a certain angle into the illuminating beam, the propagation of the illuminating beam is influenced in a known way. If it is determined in step S10 that by using a prism film the illumination for the light microscope can be improved, step S11 follows, otherwise step S13.

In step S11, initially the prism film is incorporated into the beam path. In addition the rear diaphragm is set to a YZ position which is determined in dependence upon the objective—zoom body combination used and the zoom magnification set. The front diaphragm can be moved to a Y position which is also determined in dependence upon the objective-zoom body combination and the zoom magnification set. The Z position of the front diaphragm can be adjusted to a position Zmin slightly above the light source.

Step S12 follows step S11. In step S12, the side diaphragms are moved to X positions which are determined in dependence upon the objective-zoom body combination and the adjusted zoom magnification, whereby it is considered that the prism film is in the beam path.

If it is determined in step S10 that improved illumination cannot be achieved with prism film, step S13 follows, in which no prism film is used. It is rather checked which of the available diaphragms can be moved closest to the ideal Z position. If it is ascertained that the ideal Z position lies below the available installation space, step S14 follows. If on the other hand the ideal Z position is too high, step S15 follows.

In step S14 the front diaphragm is positioned at the smallest possible Z value. In addition it can be provided that the Y position of the front diaphragm is dependent upon the objective-zoom body combination used and the zoom magnification set so that no trimming of the beam path can take place. The rear diaphragm is opened in this case, whereby this can take place as described in step S2. The previously mentioned step S9 for setting the two side diaphragms then follows.

If on the other hand it is ascertained in step S13 that the ideal Z position is too high for the available installation space, in step S15 the rear diaphragm is set to the highest possible Z position for a trim-free setting similarly to the process in step S14. The front diaphragm is opened in this case. Step S9 likewise follows for setting the side diaphragms.

All available diaphragms are thus set in the best possible way and the method according to the invention is concluded.

An apparatus according to the invention with four diaphragms which is suitable for carrying out the method described for adjusting the most suitable lighting is described below by reference to FIG. 17.

Figure 17:
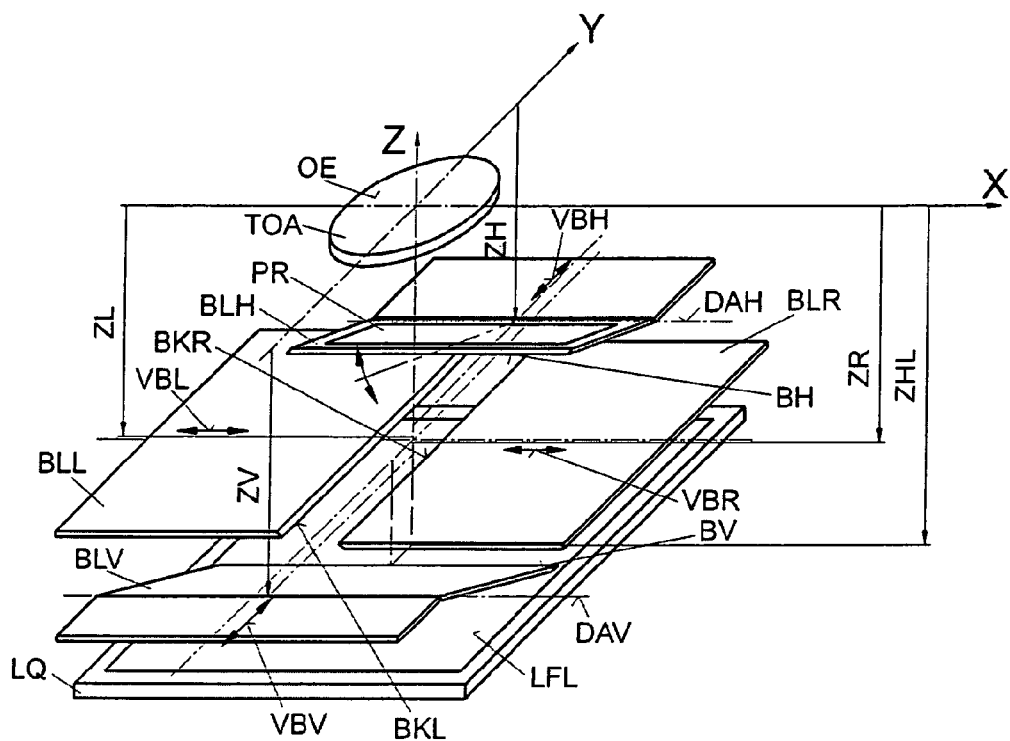
FIG. 17: shows a schematic perspective view of four diaphragms of an apparatus according to the invention for transmitted light illumination.
Figure 18:
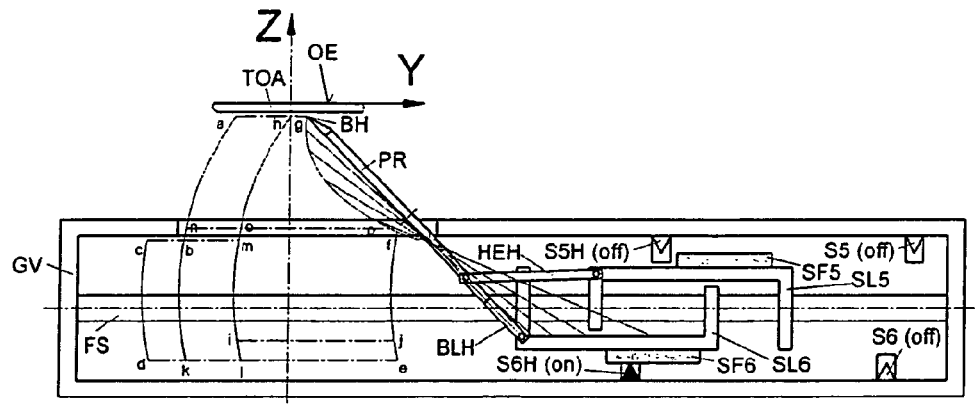
FIGS. 18 to 22: show steps of a method according to the invention for determining the absolute position of a diaphragm edge of an apparatus according to the invention.
Figure 19:
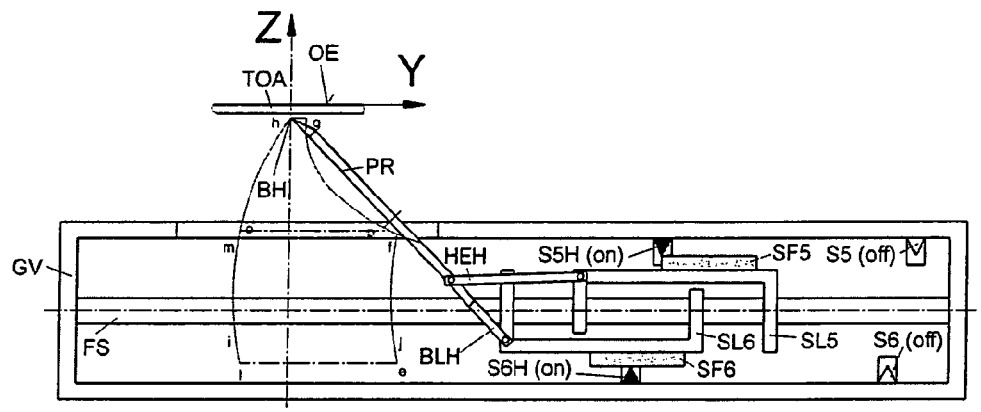
Figure 20:
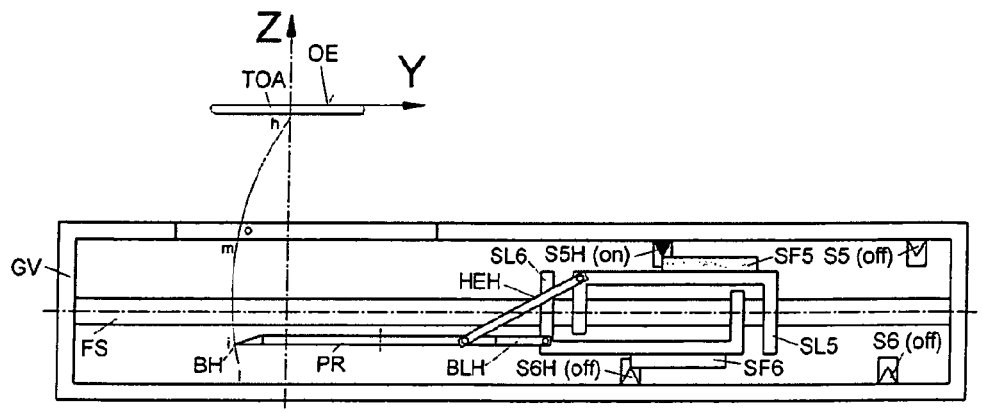
Figure 21:
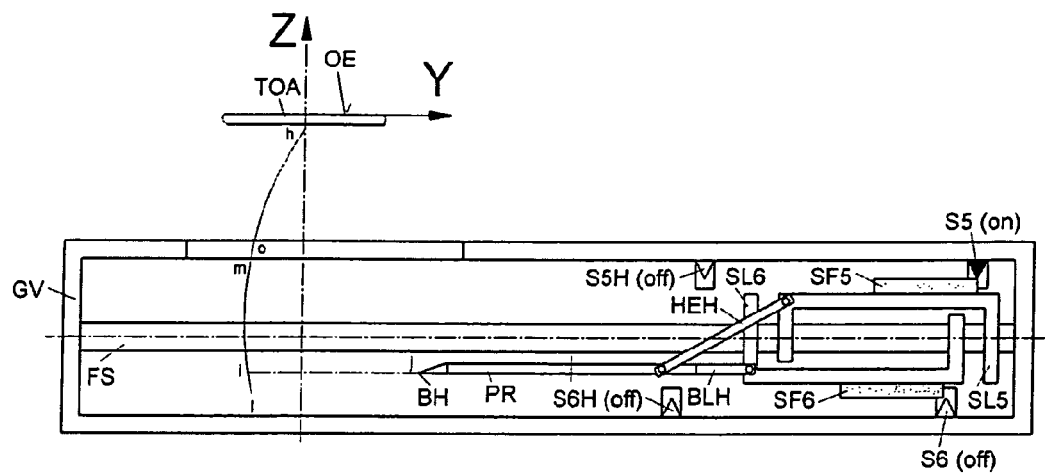
Figure 22:
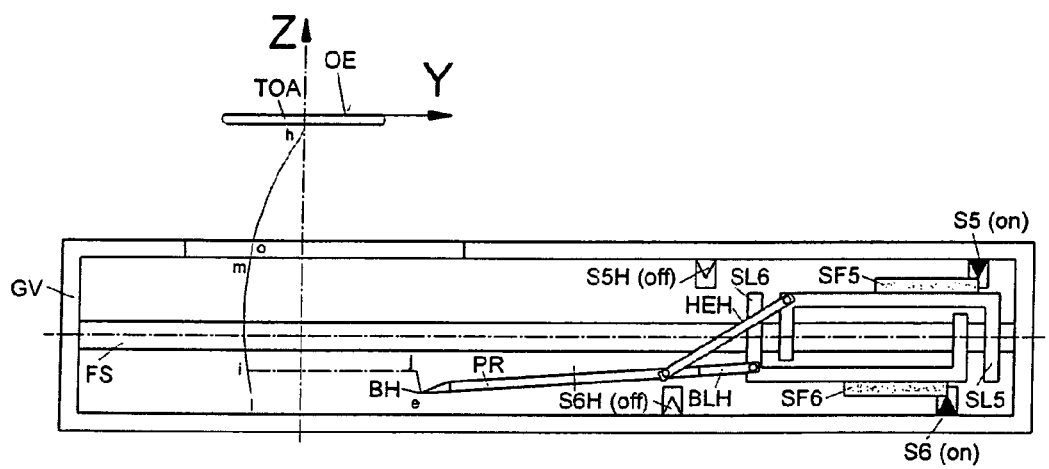

FIG. 17 shows a schematic perspective view of four diaphragms BLL, BLR, BLV and BLH of an apparatus according to the invention. Below the diaphragms, a light source LQ with a light area LFL is present. Above the diaphragms there is the transparent object support TOA which represents the object plane OE.

The diaphragms BLL, BLR, BLV and BLH each have a linear diaphragm edge BKL, BKR, BV and BH and thus form a rectangular free space. In order to be able to adjust the size and position of the free space, the diaphragms can be displaced in the XY plane. According to the invention the diaphragms are not only adjustable in the XY plane for reducing the scattered light, but also displaceable in the Z direction. The following references are also relevant in FIG. 17: VBH=displacement direction of the rear diaphragm; VBL: displacement direction of the left diaphragm; VBR=displacement direction of the right diaphragm; and VBV which describes a displacement direction of the front diaphragm. ZH describes in FIG. 17 the Z coordinate of the rear rotation axis DAH. ZL and ZR respectively refer in FIG. 17 to the Z coordinates of the left and right diaphragm edge. Finally, ZV describes the Z coordinate of the front rotation axis DAV.

According to the invention it can be provided that in dependence upon the objective—zoom body combination used, a previously defined diaphragm form is adjusted. The previously defined diaphragm forms are defined by the respective positions of the available diaphragms.

According to the invention a contrast mode "azimuth" can be selected. In this mode, the form of the free space between the diaphragms is fixed but the X-Y position of the free space can be changed. Different contrasts are hereby possible during the observation.

The diaphragms are not required to lie according to the invention in the same Z plane. In the embodiment shown the four diaphragms are offset relative to each other in the Z direction and their movement spaces overlap each other in the Z direction. The diaphragm edge BV of the lowermost diaphragm BLV and the diaphragm edge BH of the uppermost diaphragm BLH are additionally height adjustable, that is to say they can be moved in Z direction. In this connection, it is possible to rotate them about a rotation axis DAV, DAH. No height adjustment is provided for the left and right diaphragm.

The most ideal form in terms of cost is a linear diaphragm edge BK as this can be easily produced without great resources. Slightly curved diaphragm edges BK can also be used in principle but then, with the tilting of the diaphragm BL with fixed XYZ coordinates of a single point on the diaphragm edge BK with increasing distance from this point along the diaphragm edge BK, the Y and Z values also change, which is in practice difficult to manage. Curves of the diaphragm edge BK which lie in the region of the usual manufacturing tolerances and/or which do not yet lead to visible non-homogeneities do not play a role here.

In order to position the height adjustable diaphragm edges BV and BH, these are preferably connected to two carriages which are driven with stepper motors. For both side diaphragm edges BKL and BKR, a stepper motor for moving in the X direction is sufficient. The carriages of the height adjustable diaphragm edges BV and BH can be formed as described in connection with FIG. 11.

In order to be able to calculate the YZ coordinates of the diaphragm edges BV and BH from the setting of the carriages, it is necessary in addition to know the absolute carriage positions. Cost-effective stepper motors are preferably used as a drive, said stepper motors facilitating a linear movement via a rack and pinion engagement. However, the absolute position of a linear drive with simple stepper motors must be set in a known position. This preferably takes place upon connection through a determined initialisation sequence.

If upon initialisation of the stepper motors, both the carriages shown in FIG. 11 moved synchronously into the end position in which switching flags of the carriages have reached corresponding position sensors for the end position, the Z coordinate of the diaphragm edge would remain constant. If the diaphragm has been moved out into the table installation space, for example because the transmitted light apparatus has been disconnected with the diaphragm in this position, such an initialisation would lead to a collision with the housing.

In order to avoid this, the initialisation according to the invention described below is carried out, the sequence of which is shown schematically in FIGS. 18 to 22. Here, the diaphragm BLH is moved through two carriages SL5 and SL6 from an unknown position into a lowermost position. Insofar as the carriage SL5 is connected via a rear lever HEH with the diaphragm BLH, said diaphragm BLH can be rotated. The object plane OE on the transparent object support TOA is provided here above the housing G by a sample support table (not shown).

The carriages SL5 and SL6 have switching flags SF5 and SF6 which cooperate with position and auxiliary position sensors S5, S6 as well as S5H and S6H. If S5H is off, that is to say the switching flag SF5 is not in the region of this sensor, according to the arrangement according to the invention the diaphragm edge BH is within the area h-o-m-i-l-e-j-f-p-g-h, see FIG. 18. Both carriages SL5 and SL6 are now moved forwards synchronously until the sensor SH5 switches on. The diaphragm edge is now on the curve h-o-m-i-l, see FIG. 19. The lower carriage SL6 is then moved until SL6 switches to off. The diaphragm edge is now at point i, see FIG. 20. Both carriages can now be moved back synchronously until the sensor S5 switches on, see FIG. 21. The diaphragm apparatus has thus arrived at the starting state without the diaphragm BLH impacting against a part of the housing. If the carriage SL6 continues to move until also sensor S6 switches on, the diaphragm has reached the lowermost plane, see FIG. 22.

Interruption-free and simple operation of the diaphragm arrangement is guaranteed through the arrangement according to the invention of the sensors S5, S6, SH5 and SH6 and through the dimensions of the switching flags SF5 and SF6.

After this initialisation process, the absolute position of the carriages is known. Using the lever geometry it is also possible to determine the corresponding YZ coordinates of the diaphragm edge BH insofar as the position of the diaphragm edge BH relative to the switching position is known. This can only be determined very imprecisely via fixed measures and a suitable adjustment process by means of an electronic offset correction is thus provided. In this connection the diaphragm edge is brought into a known optically visible position. The deviations relative to the real or tolerance-based switching point position of the switching flags SF5 and SF6 are balanced out with the offset correction.

The field of utilisation can advantageously be extended with the apparatus according to the invention through a sample support table without expensive absolute measurement systems for position detection and for position setting of the diaphragms being required.

By reference to FIG. 11 it is possible, through the movement of the two carriages in the directions VBHH or VBH along a guide path by a certain number of steps of the driving stepper motor, to move the associated diaphragm edge by a certain YZ value. As the absolute position of the carriages is known through the initialisation process, the corresponding YZ coordinate of the diaphragm edge BH can be calculated. The calculation can also be carried out inversely, that is to say from a predefined movement path of the diaphragm edge BH in the Y and/or Z direction the carriage paths and the number of steps of the stepper motor required for this can also be calculated.

Without limitation the invention can be generalised in that for example the beam path in the transmitted light cover is folded through deflection optics such as mirrors, and in that lenses are used as relay optics.

With the present invention a cost-effective transmitted light illumination method and an apparatus for transmitted light illumination are provided which are particularly suited for illuminating low-contrast transmitted light objects in the smaller overview magnifications in the bright field on stereo microscopes and macroscopes.

The method provides homogeneous illumination in a very large field of vision. In this connection the diaphragm edge can be positioned within a maximum available installation space. This is determined according to the invention with means for detecting the presence and identity of additional attachments. Using an optionally mountable sample support table, it is possible to advantageously increase the available installation space. An essential advantage is also that the apparatus according to the invention can be used in a usual construction height HER, see FIG. 1, by transmitted light devices without visible interference.

Favourable or optimal illumination settings can thus also be easily set and reproduced by untrained users.

Finally the method is suitable in particular for cost-effective objective-zoom body combinations which do not have corrected pupil planes fixed over the zoom region and need not compulsorily be suitable for polarisation-optic methods.

LIST OF REFERENCE NUMERALS a Special Y-Z position of the rear diaphragm edge
AP Adapter plate with bonded magnet MA
α Adjustment angle of the deflecting mirror SP
ASPH Aspheric illumination optic
β Currently effective zoom factor of the zoom body
β1 Support point No. 1 between βmin and βmax for the description of the zoom factor curves via approximation functions β2 Support point No. 2 between βmin and βmax for the description of the zoom factor curves via approximation functions β3 Support point No. 3 between βmin and βmax for the description of the zoom factor curves via approximation functions β4 Support point No. 4 between βmin and βmax for the description of the zoom factor curves via approximation functions β5 Support point No. 5 between βmin and βmax for the description of the zoom factor curves via approximation functions β6 Support point No. 6 between βmin and βmax for the description of the zoom factor curves via approximation functions β7 Support point No. 7 between βmin and βmax for the description of the zoom factor curves via approximation functions β8 Support point No. 8 between βmin and βmax for the description of the zoom factor curves via approximation functions β9 Support point No. 9 between βmin and βmax for the description of the zoom factor curves via approximation functions β10 Support point No. 10 between βmin and βmax for the description of the zoom factor curves via approximation functions β11 Support point No. 11 between βmin and βmax for the description of the zoom factor curves via approximation functions β12 Support point No. 12 between βmin and βmax for the description of the zoom factor curves via approximation functions β13 Support point No. 13 between βmin and βmax for the description of the zoom factor curves via approximation functions b Special YZ position of the rear diaphragm edge BE Operating unit for the whole system BH Diaphragm edge rear BK Diaphragm edge BKL Diaphragm edge left BKR Diaphragm edge right BL Diaphragm BLH Rear diaphragm BLL Left diaphragm BLR Right diaphragm BLV Front diaphragm BMAB Operating element for motorised aperture diaphragm MAB BMFT Operating element for the motorised focussing device BMZK Operating element for the motorised zoom body BV Diaphragm edge front BZR Auxiliary pin for fixing the magnet MR to the ring light RL BZT Auxiliary pin for fixing the magnet MT to the table KT c Special YZ position of the rear diaphragm edge COW Coded objective changer d Special YZ position of the rear diaphragm edge DA Rotation axis DAH Rotation axis rear diaphragm DAV Rotation axis front diaphragm DG Thickness of the transparent object support TOA or the glass plate DL Transmitted light device e Special YZ position of the rear diaphragm edge E Plane at the level of the object support on the transmitted light device; this plane is generally formed through the upper side of the transmitted light device EM Electronic module for controlling the whole system (signal processing, etc.)

ET Plane at the level of the object support on the table; this plane is generally formed by the upper side of the table f Special YZ position of the rear diaphragm edge f2(1) Ideal diaphragm position in Z direction for the objective OBJ2 on the motorised zoom body MZK at the support point No. 1, i.e. at β1 f2(2) Ideal diaphragm position in Z direction for the objective OBJ2 on the motorised zoom body MZK at the support point No. 2, i.e. at β2 f2(3) Ideal diaphragm position in Z direction for the objective OBJ2 on the motorised zoom body MZK at the support point No. 3, i.e. at β3 f2(4) Ideal diaphragm position in Z direction for the objective OBJ2 on the motorised zoom body MZK at the support point No. 4, i.e. at β4 f2(5) Ideal diaphragm position in Z direction for the objective OBJ2 on the motorised zoom body MZK at the support point No. 5, i.e. at β5 f2(6) Ideal diaphragm position in Z direction for the objective OBJ2 on the motorised zoom body MZK at the support point No. 6, i.e. at β6 f2(7) Ideal diaphragm position in Z direction for the objective OBJ2 on the motorised zoom body MZK at the support point No. 7, i.e. at β7 f2(8) Ideal diaphragm position in Z direction for the objective OBJ2 on the motorised zoom body MZK at the support point No. 8, i.e. at β8 f2(9) Ideal diaphragm position in Z direction for the objective OBJ2 on the motorised zoom body MZK at the support point No. 9, i.e. at β9 f2(10) Ideal diaphragm position in Z direction for the objective OBJ2 on the motorised zoom body MZK at the support point No. 10, i.e. at β10 f2(11) Ideal diaphragm position in Z direction for the objective OBJ2 on the motorised zoom body MZK at the support point No. 11, i.e. at β11 f2(12) Ideal diaphragm position in Z direction for the objective OBJ2 on the motorised zoom body MZK at the support point No. 12, i.e. at β12 f2(13) Ideal diaphragm position in Z direction for the objective OBJ2 on the motorised zoom body MZK at the support point No. 13, i.e. at β13

FF Front area of the light conductor LL

FS Guide path of a linear guide, e.g. via a guide rod g Special YZ position of the rear diaphragm edge G Housing GV Housing with simplified illustration h Special YZ position of the rear diaphragm edge H1 Rear light beam 1

H1' Rear light beam 1 with beam offset through transparent object support TOA or glass plate H2 Rear light beam 2

H2' Rear light beam 2 with beam offset through transparent object support TOA or glass plate HB1 Height distance from the light area LFL to the diaphragm BL in the ideal Z diaphragm position for the objective OBJ1 on the zoom body MZK with the current zoom factor β

HEH Lever rear

HER Ergonomically justifiable construction height of the transmitted light device DL HM Rear middle light beam HM' Rear middle light beam with beam offset through transparent object support TOA or glass plate
HSA Hall sensor for adapter plate detection
HSR Hall sensor for ring light detection
HST Hall sensor for table detection
HT Z displacement of the object plane through the table KT; corresponds generally to the table height
hVB Displacement direction for adapting the diaphragm edge to the ideal Z diaphragm position
i Special YZ position of the rear diaphragm edge
j Special YZ position of the rear diaphragm edge
k Special YZ position of the rear diaphragm edge
K Camera for documentation
Kh1 Curve representing the ideal diaphragm position for OBJ1 on MZK in dependence upon $\beta$
Kh2$o$ Upper curve section representing the ideal diaphragm position for OBJ2 on MZK in dependence upon $\beta$ (between $\beta$min and $\beta$P2)
Kh2$o$min Smallest value of the upper curve section Kh2$o$
Kh2$u$ Lower curve section representing the ideal diaphragm position for OBJ2 on MZK in dependence upon b (between $\beta$P2 and $\beta$max)
Kh2$u$max Greatest value of the lower curve section Kh2$u$
Kh3 Curve representing the ideal diaphragm position for OBJ3 on MZK in dependence upon $\beta$
KLD Cold light source for supply of light to the transmitted light device DL
KT Cross table, motorised
KTF Fixed base plate of cross table KT
KTY Y carriage of cross table KT
l Special YZ position of the rear diaphragm edge
L Left image channel
L1 Left light beam 1
L1' Left light beam 1 with beam offset through transparent object support TOA or glass plate
L2 Left light beam 2
L2' Left light beam 2 with beam offset through transparent object support TOA or glass plate
L3 Left light beam 3
L3' Left light beam 3 with beam offset through transparent object support TOA or glass plate
L4 Left light beam 4
L4' Left light beam 4 with beam offset through transparent object support TOA or glass plate
L5 Left light beam 5
L5' Left light beam 5 with beam offset through transparent object support TOA or glass plate
L6 Left light beam 6
L6' Left light beam 6 with beam offset through transparent object support TOA or glass plate
LFL Light area of the light source LQ
LFLX Expansion of the light area LFL in X direction
LFLY Expansion of the light area LFL in Y direction
LL Light conductor
LM Left mid-light beam
LM' Left mid-light beam with beam offset through transparent object support TOA or glass plate
LQ Light source
LX Light area expansion in the X direction for consideration of the objective edge beams
LY Light area expansion in the Y direction for consideration of the objective edge beams
m Special YZ position of the rear diaphragm edge
M1 Middle light beam 1
M1' Middle light beam 1 with beam offset through transparent object support TOA or glass plate
M2 Middle light beam 2
M2' Middle light beam 2 with beam offset through transparent object support TOA or glass plate
MA Magnet in adapter plate AP for adapter plate detection
MFT Motorised focussing device
MR Magnet for ring light detection
MT Magnet for table detection
MZK Motorised zoom body
n Special YZ position of the rear diaphragm edge
nG Refractive index of the transparent object support TOA
nO Refractive index of the object OB
NA1 Numerical aperture of objective No. 1
o Special YZ position of the rear diaphragm edge
OA Optical axis of the objective
OB Object
OBJ1 Objective No. 1
OBJ2 Objective No. 2 with entrance pupil remote from OE
OBJ3 Objective No. 3
OE Object plane (without object identical to the object support)
OF Object field or object field diameter
OH Height of the object OB including the ambient medium (e.g. Petri dish with nutrient solution) from the object support, or from the upper side of the transparent object support TOA, to the object plane OE
OK Ocular
Ö Opening distance between the beam cross-section radius in the ideal Z diaphragm position Zh1 and the optical axis OA
p Special YZ position of the rear diaphragm edge
PR Prism film
R Right image channel
R1 Right light beam 1
R1' Right light beam 1 with beam offset through transparent object support TOA or glass plate
R2 Right light beam 2
R2' Right light beam 2 with beam offset through transparent object support TOA or glass plate
R3 Right light beam 3
R3' Right light beam 3 with beam offset through transparent object support TOA or glass plate
R4 Right light beam 4
R4' Right light beam 4 with beam offset through transparent object support TOA or glass plate
R5 Right light beam 5
R5' Right light beam 5 with beam offset through transparent object support TOA or glass plate
R6 Right light beam 6
R6' Right light beam 6 with beam offset through transparent object support TOA or glass plate
RL Ring light, which is optionally mountable in the table
RM Right mid-light beam
RM' Right mid-light beam with beam offset through transparent object support TOA or glass plate
S5 Position sensor for the carriage SL5
S5H Auxiliary position sensor for the carriage SL5
S6 Position sensor for the carriage SL6
S6H Auxiliary position sensor for the carriage SL6
SF5 Switching flag 5 for activating position sensor S5 and possibly auxiliary position sensor S5H
SF6 Switching flag 6 for activating position sensor S6 and possibly auxiliary position sensor S6H
SL5 Carriage 5
SL6 Carriage 6
SP Deflection mirror
SR1 Operating element 1 in the transmitted light device DL
ST1 Light beam 1
ST2 Light beam 2
ST3 Light beam 3

ST4 Light beam 4
ST5 Light beam 5
SU Opening distance from the diaphragm-side edge beam of the back-projected image beams to the optical axis OA, which is covered by the diaphragm BL displaced by the displacement path UOE pointing away from the object plane OE
SV Beam offset
T Objective barrel
TOA Transparent object support
TR Carrier
u Special YZ position of the front diaphragm edge
UOE Displacement path of the diaphragm BL from the ideal diaphragm position in the direction pointing away from the object plane OE
V1 Front light beam 1
V1' Front light beam 1 with beam offset through transparent object support TOA or glass plate
V2 Front light beam 2
V2' Front light beam 2 with beam offset through transparent object support TOA or glass plate
VB Displacement direction of the diaphragm BL
VBH Displacement direction of the rear diaphragm
VBL Displacement direction of the left diaphragm
VBR Displacement direction of the right diaphragm
VBV Displacement direction of the front diaphragm
VM Front mid-light beam
VM' Front mid-light beam with beam offset through transparent object support TOA or glass plate
VR Displacement direction
X X coordinate axis of the XYZ coordinate system
Y Y coordinate axis of the XYZ coordinate system
Z Z coordinate axis of the XYZ coordinate system
ZDAmax Greatest possible Z coordinate of the diaphragm edge with adapter without table
ZDATmax Greatest possible Z coordinate of the diaphragm edge with adapter and table
ZDmax Z coordinate of the uppermost diaphragm position which can be constructively realised
ZDmin Z coordinate of the lowermost diaphragm position without table which can be constructively realised
ZDTmax Greatest possible Z coordinate of the diaphragm edge with table which can be achieved without further inventive measures
ZDTmin Smallest possible Z coordinate of the diaphragm edge with table
ZEP1 Z coordinate of the entrance pupil for objective No. 1 in the current zoom magnification
ZEP2 Z coordinate of the entrance pupil for objective No. 2 in the current zoom magnification
ZEP3 Z coordinate of the entrance pupil for objective No. 3 in the current zoom magnification
Zh Z coordinate of the diaphragm edge BK in the ideal Z diaphragm position for the current objective in the current zoom magnification
Zh1 Z coordinate of the diaphragm edge in the ideal Z diaphragm position for the objective No. 1 in the current zoom magnification
Zh1max Maximum value of Zh for objective No. 1
Zh1min Minimum value of Zh for objective No. 1
Zh2 Z coordinate of the diaphragm edge BK in the ideal diaphragm position for objective No. 2 in the current zoom magnification
Zh2max Maximum value of Zh for objective No. 2
Zh2min Minimum value of Zh for objective No. 2
Zh3 Z coordinate of the diaphragm edge BK in the ideal Z diaphragm position for objective No. 3 in the current zoom magnification
Zh3max Maximum value of Zh for objective No. 3
Zh3 min Minimum value of Zh for objective No. 3
ZH Z coordinate of the rear rotation axis DAH
ZHL Z coordinate of the light area LFL
ZL Z coordinate of the left diaphragm edge
Zmin Smallest possible adjustable Z coordinate in the current system environment
Zmax Greatest possible adjustable Z coordinate in the current system environment
ZR Z coordinate of the right diaphragm edge
ZThmin Smallest possible Z coordinate of the rear diaphragm edge with table
ZThmax Greatest possible Z coordinate of the rear diaphragm edge with table and ring light RL
ZV Z coordinate of the front rotation axis DAV

The invention claimed is:

1. A transmitted light illumination apparatus for light microscopes with a changing effective entrance pupil of an objective, the apparatus comprising
a light source adapted to emit an illuminating light beam,
a housing, in which the light source is arranged,
a holding device for holding a sample to be examined, and
at least one diaphragm edge to trim the illuminating light beam,
wherein the diaphragm edge extends transversely to an optical axis of a light microscope, which can be positioned in an operating state on the transmitted light illumination apparatus, and
wherein a beam path of the illuminating light between the diaphragm edge and the sample which is held by the holding device is free of adjustable beam-focusing components,
wherein
in order to adapt the beam path of the illuminating light to the effective entrance pupil of the objective means for variable positioning of the diaphragm edge in direction of the optical axis are provided, wherein a position of the diaphragm edge in the direction of the optical axis can be varied irrespectively of a position of the diaphragm edge transversely to the optical axis,
assembly means are provided on the housing for assembling a separate sample support table,
means are present for determining whether a sample support table is located at the housing,
the housing comprises a passage opening, through which the diaphragm edge can be moved in the direction of the optical axis,
the holding device is formed in the region of the passage opening of the housing or on a separate sample support table, and
a control device is provided which is adapted to position the diaphragm edge in dependence upon at least a determined presence of a sample support table at the housing.

2. Apparatus according to claim 1,
wherein
means are provided for determining an identity of a sample support table,
the control device is adapted to position the diaphragm edge in dependence upon a determined identity of a sample support table.

3. Apparatus according to claim 1,
wherein
the control device is adapted to move the diaphragm edge through the passage opening of the housing precisely when the means for determining the location of a sample support table at the housing determine the location of a sample support table at the housing.

4. Apparatus according to claim 1, wherein accessories can be inserted in the sample support table, means are provided for determining whether accessories are introduced into the sample support table, and the control device is adapted to position the diaphragm edge in dependence of a determined introduction of accessories into the sample support table.

5. Apparatus according to claim 4, wherein means are provided for determining the identity of accessories introduced into the sample support table, the control device is adapted to position the diaphragm edge in dependence upon a determined identity of accessories inserted into the sample support table.

6. Apparatus according to claim 1, wherein assembly means for an adapter plate for influencing the illuminating light beam are present, means are provided for determining whether an adapter plate is located at the housing and the control device is adapted to position the diaphragm edge in dependence of a determined location of an adapter plate at the housing.

7. Apparatus according to claim 6, wherein means are provided to determine an identity of an adapter plate, the control device is adapted to position the diaphragm edge in dependence upon a determined identity of an adapter plate.

8. Device according to claim 1, wherein in order to change the contrast, means are provided for variable positioning of the diaphragm edge a direction transversely to the optical axis.

9. Apparatus according to claim 1, wherein the means for determining the whether a sample support table is located at the housing, the means for determining whether accessories are inserted into the sample support table, and the means for determining whether an adapter plate is located at the housing, respectively, comprise a magnetic field sensor.

10. Apparatus according to claim 1, wherein the diaphragm edge can be rotated about a rotation axis which is transverse to the optical axis with the means for variable positioning of the diaphragm edge in the direction of the optical axis and with the means for variable positioning of the diaphragm edge in a direction transversely to the optical axis.

11. Transmitted light illumination method for a light microscope with changing effective entrance pupil of an objective, in which a sample held by a holding device is subjected to illuminating light from a light source and in which an illuminating light beam emitted from the light source is trimmed by a diaphragm edge arranged between the holding device and the light source, wherein the light source is arranged in a housing, on which a separate sample support table can be assembled with assembly means, wherein the holding device is formed in the region of the passage opening of the housing or on a separate sample support table and wherein the housing comprises a passage opening, through which the diaphragm edge can be moved in the direction of an optical axis, wherein it is determined whether a sample support table is located at the housing, and the diaphragm edge extends transversely to an optical axis and is positioned in direction of the optical axis in dependence of the position of the effective entrance pupil of the objective and in dependence of at least a determined location of a sample support table at the housing.

12. Method according to claim 11, wherein if the diaphragm edge has been moved through the passage opening into the sample support table and it is determined with the means for determining whether a sample support table is located at the housing that the sample support table is removed, movement of the diaphragm edge is blocked.

13. Method according to claim 11, wherein if the diaphragm edge has been moved through the passage opening into the sample support table and it is determined with the means for determining whether a sample support table is located at the housing that the sample support table is removed, the diaphragm edge is moved back into the housing.

14. Method according to claim 11, wherein for the movement of the diaphragm edge through the passage opening the diaphragm edge is rotated at least about a rotation axis which is transverse to the optical axis.

15. Method according to claim 11, wherein at least one of a microscope setting and a microscope configuration is enquired, an optimal diaphragm position is determined using the at least one of the microscope setting and the microscope configuration, at least one of the location of a sample support table at the housing, the introduction of accessories into the sample support table and the location of an adapter plate at the housing is determined and from this information an available movement space of the diaphragm edge in the direction of the optical axis is determined, the diaphragm edge is positioned at the optimal diaphragm position if the optimal diaphragm position lies in the available movement space, and if the optimal diaphragm position lies outside of the available movement space the diaphragm edge is positioned at an end of the available movement space adjacent to the optimal diaphragm position.

16. Method according to claim 11, wherein at least one of a microscope setting and a microscope configuration is enquired, an optimal diaphragm position is determined using the at least one of the microscope setting and the microscope configuration, at least one of the location of a sample support table at the housing, the introduction of accessories into the sample support table and the location of an adapter plate at the housing is determined and from these, an available movement space of the diaphragm edge in the direction of the optical axis is determined, it is checked whether the optimal diaphragm position lies within the available movement space, if the optimal diaphragm position lies outside of the available movement space, a prism film is moved into the illuminating light beam, and if the optimal diaphragm position lies in the available movement space, the diaphragm edge is positioned at the optimal diaphragm position.

17. Microscope system having a light microscope and an apparatus for transmitted light illumination according to claim 1.

* * * * *